United States Patent
Wei et al.

(10) Patent No.: US 12,395,980 B2
(45) Date of Patent: Aug. 19, 2025

(54) REFERENCE SIGNAL TRANSMISSION METHOD AND COMMUNICATION APPARATUS

(71) Applicant: HUAWEI TECHNOLOGIES CO., LTD., Guangdong (CN)

(72) Inventors: Yi Wei, Shenzhen (CN); Xueru Li, Beijing (CN); Bingyu Qu, Beijing (CN); Di Zhang, Shenzhen (CN); Mingxin Gong, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 304 days.

(21) Appl. No.: 17/690,719

(22) Filed: Mar. 9, 2022

(65) Prior Publication Data

US 2022/0201715 A1    Jun. 23, 2022

Related U.S. Application Data

(63) Continuation of application No. PCT/CN2020/114615, filed on Sep. 10, 2020.

(30) Foreign Application Priority Data

Sep. 10, 2019   (CN) .................... 201910855178.7
Sep. 9, 2020    (CN) .................... 202010943735.3

(51) Int. Cl.
*H04W 72/1263* (2023.01)
*H04L 5/00* (2006.01)
*H04W 72/0446* (2023.01)

(52) U.S. Cl.
CPC ....... *H04W 72/1263* (2013.01); *H04L 5/0051* (2013.01); *H04W 72/0446* (2013.01)

(58) Field of Classification Search
CPC ......... H04W 72/1263; H04W 72/0446; H04W 72/23; H04W 72/21; H04L 5/0051; H04L 5/0094; H04L 5/0048; H04L 5/1438
See application file for complete search history.

(56) References Cited

U.S. PATENT DOCUMENTS

2019/0165971 A1    5/2019  Manolakos et al.
2019/0254061 A1*   8/2019  Manolakos ........... H04L 5/0051
(Continued)

FOREIGN PATENT DOCUMENTS

CN     109863800 A      6/2019
WO     2019136640 A1    7/2019
(Continued)

OTHER PUBLICATIONS

Extended European Search Report issued in European Application No. 20862670.5 on Sep. 20, 2022, 8 pages.
(Continued)

*Primary Examiner* — Thai Nguyen
(74) *Attorney, Agent, or Firm* — Fish & Richardson P.C.

(57) ABSTRACT

This application provides example reference signal (RS) transmission methods and example communication apparatuses. One example reference signal transmission method includes receiving, by a terminal device, first information in a first time unit, where the first information triggers the terminal device to transmit a RS. The terminal device can then transmit the RS in a second time unit, where the second time unit is indicated by a time offset indicator n in valid uplink transmission time units starting from the first time unit.

20 Claims, 7 Drawing Sheets

---

Terminal device | Network device

101. The network device sends first information in a first time unit, and the terminal device receives the first information in the first time unit, where the first information is used to trigger the terminal device to send an RS 102. The terminal device sends the RS in a second time unit, and the network device receives the RS in the second time unit, where the second time unit is a time unit indicated by a time offset indicator n in valid uplink transmission time units starting from the first time unit

(56) References Cited

U.S. PATENT DOCUMENTS

2020/0412581 A1* 12/2020 Zhang .................. H04W 72/23
2021/0409178 A1* 12/2021 Faxér ........................ H04L 5/14

FOREIGN PATENT DOCUMENTS

| WO | 2019160756 A1 | 8/2019 | | |
|---|---|---|---|---|
| WO | WO-2020263899 A1 * | 12/2020 | ......... | H04L 25/0224 |
| WO | WO-2021206382 A1 * | 10/2021 | ............... | H04L 1/08 |

OTHER PUBLICATIONS

Huawei, HiSilicon, "Remaining details of SRS design," 3GPP TSG RAN WG1 Meeting #91, R1-1719441, Reno, USA, Nov. 27-Dec. 1, 2017, 12 pages.

PCT International Search Report and Written Opinion issued in International Application No. PCT/CN2020/114615 on Dec. 11, 2020, 15 pages (with English translation).

Office Action issued in Indian Application No. 202217012658 on Jul. 22, 2022, 5 pages.

* cited by examiner

REFERENCE SIGNAL TRANSMISSION METHOD AND COMMUNICATION APPARATUS

CROSS-REFERENCE TO RELATED APPLICATIONS

This application is a continuation of International Application No. PCT/CN2020/114615, filed on Sep. 10, 2020, which claims priority to Chinese Patent Application No. 202010943735.3, filed on Sep. 9, 2020 and Chinese Patent Application No. 201910855178.7, filed on Sep. 10, 2019. The disclosures of the aforementioned applications are hereby incorporated by reference in their entireties.

TECHNICAL FIELD

Embodiments of this application relate to the field of communication technologies, and to a reference signal transmission method and a communication apparatus.

BACKGROUND

In a communication system, channel state information of a channel may be obtained through a reference signal, and a network device can select a more appropriate modulation and coding scheme, more appropriate precoding information, and the like based on the channel state information. For example, the network device may obtain the channel state information by receiving a sounding reference signal (SRS) sent by a terminal. The SRS may be an aperiodic reference signal. The network device configures an SRS resource set for the terminal device. When the network device triggers the SRS by using downlink control information (DCI), the terminal device may transmit, based on a value, namely, X, of a time offset (time offset) in the SRS resource set, the SRS in a time unit with a time offset of X after a time unit in which the DCI is located.

FIG. 1 is a schematic diagram of slots in a system frame. It is assumed that X configured in the SRS resource set is equal to 5. When the terminal device is required by the network device to transmit the SRS in slot 8, the network device needs to transmit the DCI in slot (8 minus 5), namely, slot 3, in advance, to trigger the terminal device to transmit the SRS in slot 8. If there is no data scheduling requirement in slot 3, the network device cannot include a trigger indication in the DCI for scheduling data and cannot trigger the terminal device to transmit the SRS. In this case, extra DCI may need to be sent to specially trigger the SRS, causing a resource waste.

SUMMARY

Embodiments of this application provide a reference signal transmission method and a communication apparatus, which helps reduce resource overheads.

According to a first aspect, embodiments of this application provide a reference signal transmission method. In the reference signal transmission method, a terminal device receives first information in a first time unit, where the first information is used to trigger the terminal device to transmit a reference signal RS; and the terminal device transmits the RS in a second time unit, where the second time unit is a time unit indicated by a time offset indicator n in valid uplink transmission time units starting from the first time unit.

A manner in which the time offset indicator n indicates a time unit in the valid uplink transmission time units starting from the first time unit in this implementation is compared with a manner in which the time offset indicator n indicates a time offset between the first time unit and the second time unit. It can be learned that, because a quantity of the valid uplink transmission time units starting from the first time unit is less than a quantity of time units starting from the first time unit, fewer bits are required by the time offset indicator n in this implementation.

In addition, in this implementation, when valid uplink transmission time units separately starting from a plurality of first time units are the same, even if the second time unit and the time offset indicator n are relatively fixed, any one of the plurality of first time units may be used to trigger the terminal device to transmit the RS. In the manner in which the time offset indicator n indicates the time offset between the first time unit and the second time unit, when the second time unit and the time offset indicator n are relatively fixed, the first time unit is unique. Therefore, this implementation can further improve the flexibility of selecting the first time unit.

In this way, on one hand, it helps the network device select a time unit that carries data scheduling control information as the first time unit, to merely trigger the terminal device to transmit the RS by using the data scheduling control information, thereby avoiding a resource waste caused by transmitting extra first information to specially trigger the terminal device to transmit the RS. On the other hand, it helps the network device transmit, in different first time units, a plurality of pieces of first information that trigger a plurality of terminal devices to separately transmit the RS, thereby avoiding control channel congestion caused by transmitting the plurality of pieces of first information in a same first time unit.

In an implementation, the second time unit is an $m^{th}$ time unit in the valid uplink transmission time units starting from the first time unit, where m is equal to a value of the time offset indicator n. The value of the time offset indicator n is greater than zero.

In another implementation, the second time unit is an $m^{th}$ time unit in the valid uplink transmission time units starting from the first time unit, where m is equal to a value of the time offset indicator n plus 1. The value of the time offset indicator n is greater than or equal to zero.

In still another implementation, the second time unit is an $m^{th}$ time unit in the valid uplink transmission time units starting from the first time unit, where m is determined based on the time offset indicator n and a correspondence. The correspondence is a correspondence between optional values of m and optional values of the time offset indicator n. The correspondence may be determined based on an order of index numbers of the optional values of m and an order of the optional values of n. The optional values or a value range of m may be predefined, configured by using higher layer signaling, or configured by using MAC-CE signaling.

In still another implementation, the second time unit is an $m^{th}$ time unit in the valid uplink transmission time units starting from the first time unit. When the first time unit is a special time unit, m is equal to the value of n plus 1, that is, m=n+1. When the first time unit is a downlink time unit, m is equal to the value of n, that is, m=n, and n is not equal to 0.

In an implementation, the first information is further used to indicate the time offset indicator n. By way of example and without limitation, the first information includes the time offset indicator n. It can be learned that this implementation helps the network device flexibly determine the second time unit, the first time unit, and the time offset indicator n, thereby further increasing the flexibility of selecting the first time unit.

In another implementation, the terminal device receives second information, where the second information is used to configure the time offset indicator n. It can be learned that, in this implementation, the time offset indicator n is configured by using the second information, so that the flexibility of selecting the first time unit can be ensured, and overheads of the time offset indicator n in the first information are not increased.

In an implementation, a maximum value of the time offset indicator n is predefined, the maximum value of the time offset indicator n is configured by using higher layer signaling or media access control control element MAC CE signaling, or the maximum value of the time offset indicator n is determined based on an uplink/downlink time unit configuration. This implementation helps determine a value range of the time offset indicator n and/or a quantity of bits occupied by the time offset indicator n. Therefore, the terminal device can read the time offset indicator n from the first information or the second information.

In an implementation, the valid uplink transmission time unit is determined based on an uplink/downlink time unit configuration. Locations and quantities of valid uplink transmission time units vary with different uplink/downlink time unit configurations.

In another implementation, the valid uplink transmission time units are time units, starting from the first time unit and available for uplink transmission. For example, the valid uplink transmission time units starting from the first time unit are uplink transmission time units and/or special time units starting from the first time unit.

In an implementation, the implementations disclosed in embodiments of this application may be applied to a time division duplex (TDD) system.

In an implementation, the valid uplink transmission time unit is a time unit satisfying one or more of the following features: the time unit is a special time unit and/or an uplink time unit; a time domain resource offset between time domain resources occupied by the RS in the time unit and time domain resources occupied by the first information is greater than or equal to a processing delay of the RS, and the time domain resources occupied by the RS in the time unit are determined based on configuration information; or a quantity of time domain resources in the time unit that are allowed for transmitting the RS is greater than or equal to a quantity of the time domain resources occupied by the RS, and the quantity of the time domain resources occupied by the RS is determined based on the configuration information. This implementation helps ensure that the valid uplink transmission time units can be used to transmit the RS, and a quantity of valid uplink transmission time units to be indicated by the time offset indicator n can be further reduced, thereby reducing the quantity of bits occupied by the time offset indicator n.

In another implementation, the valid uplink transmission time units are time units, starting from the first time unit, available for uplink transmission, and satisfying the foregoing one or more features. This implementation helps ensure that the valid uplink transmission time units can be used to transmit the RS, and a quantity of valid uplink transmission time units to be indicated by the time offset indicator n can be further reduced, thereby reducing the quantity of bits of the time offset indicator n.

In still another implementation, the valid uplink transmission time units are time unit, starting from the first time unit, available for uplink transmission, and satisfying the following one or more features: the time unit is a special time unit and/or an uplink time unit; and a time domain resource offset between time domain resources occupied by the RS in the time unit and time domain resources occupied by the first information is greater than or equal to a processing delay of the RS, and the time domain resources occupied by the RS in the time unit are determined based on configuration information.

In this implementation, when a quantity of time domain resources in the second time unit that are used for transmitting the RS is less than a quantity of the time domain resources occupied by the RS, the terminal device may use, in the second time unit based on the configuration information, the time domain resources allowed for transmitting the RS to transmit some RSs. When a quantity of time domain resources in the second time unit that are used for transmitting the RS is greater than or equal to a quantity of the time domain resources occupied by the RS, the terminal device may use, in the second time unit based on the configuration information, the time domain resources allowed for transmitting the RS to transmit RSs.

In an implementation, when a subcarrier spacing of the first information and a subcarrier spacing of the RS are different, when the second time unit is determined based on the first time unit, conversion needs to be performed based on the subcarrier spacing of the first information and the subcarrier spacing of the RS. In other words, the first time unit is converted into a third time unit based on the subcarrier spacing of the RS. The second time unit is a time unit indicated by the time offset indicator n in the valid uplink transmission time units starting from the third time unit. The third time unit is a time unit on a subcarrier of the RS. The subcarrier spacing of the first information is a subcarrier spacing used to transmit the first information. The subcarrier spacing of the RS is a subcarrier spacing used to transmit the RS.

For example, when the subcarrier spacing of the first information and the subcarrier spacing of the RS are different, "the second time unit is a time unit indicated by the time offset indicator n in valid uplink transmission time units starting from the first time unit" may be understood as follows: The terminal device converts the first time unit into the third time unit based on the subcarrier spacing of the RS; and uses an $m^{th}$ time unit in valid uplink transmission time units starting from the third time unit as the second time unit. m is an integer determined based on the value of n.

In other words, when the subcarrier spacing of the first information and the subcarrier spacing of the RS are different, an index of the second time unit is an index indicated by the time offset indicator n in indexes that start from a first index and that correspond to the valid uplink transmission time units. The first index is an index of the third time unit. The index of the third time unit is an index corresponding to the third time unit when the first time unit is converted into the third time unit based on the subcarrier spacing of the RS, and the third time unit is the time unit on the subcarrier of the RS.

According to a second aspect, embodiments of this application further provide a reference signal transmission method. In the reference signal transmission method, a network device transmits first information in a first time unit, where the first information is used to trigger a terminal device to transmit a reference signal RS; and the network device receives the RS in a second time unit, where the second time unit is a time unit indicated by a time offset indicator n in valid uplink transmission time units starting from the first time unit.

This implementation is compared with a manner in which the time offset indicator n indicates a time offset between the first time unit and the second time unit. When a quantity of valid uplink transmission time units between the first time unit and the second time unit is less than a quantity of time units between the first time unit and the second time unit, fewer bits are required by the time offset indicator n in this implementation.

In addition, in this implementation, when valid uplink transmission time units separately starting from a plurality of first time units are the same, even if the second time unit and the time offset indicator n are relatively fixed, any one of the plurality of first time units may be used to trigger the terminal device to transmit the RS. In the manner in which the time offset indicator n indicates the time offset between the first time unit and the second time unit, when the second time unit and the time offset indicator n are relatively fixed, the first time unit is unique. Therefore, this implementation can further improve the flexibility of selecting the first time unit.

In this way, on one hand, it helps the network device select a time unit that carries data scheduling control information as the first time unit, to merely trigger the terminal device to transmit the RS by using the data scheduling control information, thereby avoiding a resource waste caused by transmitting extra first information to specially trigger the terminal device to transmit the RS. On the other hand, it helps the network device transmit, in different first time units, a plurality of pieces of first information that trigger a plurality of terminal devices to separately transmit the RS, thereby avoiding control channel congestion caused by transmitting the plurality of pieces of first information in a same first time unit.

In an implementation, the second time unit is an $m^{th}$ time unit in the valid uplink transmission time units starting from the first time unit, where m is equal to a value of the time offset indicator n. The value of the time offset indicator n is greater than zero.

In another implementation, the second time unit is an $m^{th}$ time unit in the valid uplink transmission time units starting from the first time unit, where m is equal to a value of the time offset indicator n plus 1. The value of the time offset indicator n is greater than or equal to zero.

In still another implementation, the second time unit is an $m^{th}$ time unit in the valid uplink transmission time units starting from the first time unit, where m is determined based on the time offset indicator n and a correspondence. The correspondence is a correspondence between optional values of m and optional values of the time offset indicator n. The correspondence may be determined based on index numbers of the optional values of m and index numbers of the optional values of n. The optional values or a value range of m may be predefined, configured by using higher layer signaling, or configured by using MAC-CE signaling.

In still another implementation, the second time unit is an $m^{th}$ time unit in the valid uplink transmission time units starting from the first time unit. When the first time unit is a special time unit, m is equal to the value of n plus 1, that is, m=n+1. When the first time unit is a downlink time unit, m is equal to the value of n, that is, m=n, and n is not equal to 0.

The foregoing implementations help the network device expand a selection range of the first time unit. In this way, on one hand, it helps the network device select a time unit that carries data scheduling control information as the first time unit, to merely trigger the terminal device to transmit the RS by using the data scheduling control information, thereby avoiding a resource waste caused by transmitting extra first information to specially trigger the terminal device to transmit the RS. On the other hand, it helps the network device transmit, in different first time units, pieces of first information that trigger a plurality of terminal devices to separately transmit the RS, thereby avoiding control channel congestion caused by transmitting the pieces of first information in a same first time unit.

In an implementation, the first information is further used to indicate the time offset indicator n. By way of example and without limitation, the first information includes the time offset indicator n. This implementation helps the network device further expand the selection range of the first time unit based on different values of the time offset indicator n, thereby further improving the flexibility of selecting the first time unit by the network device.

In another implementation, the network device transmits second information, where the second information is used to configure the time offset indicator n. It can be learned that, in this implementation, the time offset indicator n is configured by using the second information. It helps ensure the flexibility of selecting the first time unit and avoid an increase in resource overheads of the first information.

In an implementation, a maximum value of the time offset indicator n is predefined, the maximum value of the time offset indicator n is configured by using higher layer signaling or media access control control element MAC CE signaling, or the maximum value of the time offset indicator n is determined based on an uplink/downlink time unit configuration. In this implementation, the network device may determine a value range of the time offset indicator n or the value range of m based on the maximum value of the time offset indicator n. The network device determines the first time unit, the time offset indicator n, and the second time unit based on the value range of the time offset indicator n or the value range of m.

In an implementation, the valid uplink transmission time unit is determined based on an uplink/downlink time unit configuration.

In an implementation, the valid uplink transmission time unit is a time unit satisfying one or more of the following features: the time unit is a special time unit and/or an uplink time unit; a time domain resource offset between time domain resources occupied by the RS in the time unit and time domain resources occupied by the first information is greater than or equal to a processing delay of the RS, and the time domain resources occupied by the RS in the time unit are determined based on configuration information; or a quantity of time domain resources in the time unit that are allowed for transmitting the RS is greater than or equal to a quantity of the time domain resources occupied by the RS, and the quantity of the time domain resources occupied by the RS is determined based on the configuration information.

In another implementation, when a quantity of time domain resources in the second time unit that are allowed for transmitting the RS is less than the quantity of the time domain resources occupied by the RS, the network device may use, in the second time unit based on the configuration information, time domain resources allowed for receiving the RS to receive some RSs.

For related content of the foregoing implementations described in this aspect, refer to the related descriptions of the first aspect. Details are not described herein again.

In the first aspect and the second aspect, embodiments of this application further provide an implementation in which the valid uplink transmission time unit is a time unit satisfying one or more of the following features: the time unit is an uplink time unit; a time domain resource offset between time domain resources occupied by the RS in the time unit and time domain resources occupied by the first information is greater than or equal to a processing delay of the RS, and the time domain resources occupied by the RS in the time unit are determined based on configuration information; a quantity of time domain resources in the time unit that are allowed for transmitting the RS is greater than or equal to a quantity of the time domain resources occupied by the RS, and the quantity of the time domain resources occupied by the RS is determined based on the configuration information; K time domain resources before the first time domain resource occupied by the RS in a special time unit do not include a downlink transmission time domain resource, and K is greater than or equal to zero; or time domain resources occupied by the RS in the special time unit are located between a time domain resource L+1 to a time domain resource L+N, N is greater than or equal to 0, a time domain resource L is the last time domain resource in a control resource set CORESET in which third information is located, and the third information is used to indicate a time unit format. One or two of the latter two features may be used to determine whether the special time unit is a valid uplink transmission time unit. This helps improve the flexibility of selecting the first time unit and ensure successful transmission of the RS.

N is reported by the terminal device, configured by the network device, or predefined in a protocol.

In an implementation, in the reference signal transmission method according to the first aspect, after the terminal device receives the first information in the first time unit, and before the terminal device transmits the RS in the second time unit, the method further includes: The terminal device receives the third information, where the third information is used to indicate the time unit format, and the time unit format becomes valid after the second time unit.

In another implementation, in the reference signal transmission method according to the first aspect, after the terminal device receives the first information in the first time unit, and before the terminal device transmits the RS in the second time unit, the method further includes: The terminal device receives the third information, where the third information is used to indicate the time unit format, and the time unit format becomes valid after the last time domain resource occupied by the RS in the second time unit.

In an implementation, in the reference signal transmission method according to the second aspect, after the network device transmits the first information in the first time unit, and before the network device receives the RS in the second time unit, the method further includes: The network device transmits the third information, where the third information is used to indicate the time unit format, and the time unit format becomes valid after the second time unit.

In another implementation, in the reference signal transmission method according to the second aspect, after the network device transmits the first information in the first time unit, and before the network device receives the RS in the second time unit, the method further includes: The network device transmits the third information, where the third information is used to indicate the time unit format, and the time unit format becomes valid after the last time domain resource occupied by the RS in the second time unit.

It can be learned that the foregoing time unit format may become valid after the RS is sent. This helps ensure the flexibility of selecting the first time unit.

For the reference signal transmission method according to the first aspect or the second aspect, when time domain resources occupied by the RS overlap time domain resources occupied by another RS and a priority of the RS is higher than a priority of the another RS, a time unit in which an overlapping time domain resource is located is the valid uplink transmission time unit of the RS. This helps successfully transmit a high-priority RS.

According to a third aspect, embodiments of this application further provide a reference signal transmission method, to obtain channel state information for downlink transmission. In the reference signal transmission method, a terminal device receives first information in a first time unit, where the first information is used to indicate the terminal device to receive a reference signal RS; and the terminal device receives the RS in a second time unit, where the second time unit is a time unit indicated by a time offset indicator n in valid downlink transmission time units starting from the first time unit.

This implementation in which the time offset indicator n indicates a time unit in valid downlink transmission time units is compared with a manner in which the time offset indicator n indicates a time offset between the first time unit and the second time unit. When a quantity of valid downlink transmission time units between the first time unit and the second time unit is less than a quantity of time units between the first time unit and the second time unit, fewer bits are required by the time offset indicator n in this implementation.

In an implementation, the second time unit is an $m^{th}$ time unit in the valid downlink transmission time units starting from the first time unit, where m is equal to a value of the time offset indicator n. The value of the time offset indicator n is greater than zero.

In another implementation, the second time unit is an $m^{th}$ time unit in the valid downlink transmission time units starting from the first time unit, where m is equal to a value of the time offset indicator n plus 1. The value of the time offset indicator n is greater than or equal to zero.

In still another implementation, the second time unit is an $m^{th}$ time unit in the valid downlink transmission time units starting from the first time unit, where m is determined based on the time offset indicator n and a correspondence. The correspondence is a correspondence between optional values of m and optional values of the time offset indicator n. The correspondence may be determined based on an order of index numbers of the optional values of m and an order of the optional values of n. The optional values or a value range of m may be predefined, configured by using higher layer signaling, or configured by using MAC-CE signaling.

In still another implementation, the second time unit is an $m^{th}$ time unit in the valid downlink transmission time units starting from the first time unit. When the first time unit is a special time unit, m is equal to the value of n plus 1, that is, m=n+1. When the first time unit is a downlink time unit, m is equal to the value of n, that is, m=n, and n is not equal to 0.

In an implementation, the valid downlink transmission time unit is determined based on an uplink/downlink time unit configuration.

In another implementation, the valid downlink transmission time units are time units, starting from the first time unit and available for downlink transmission. For example, the valid downlink transmission time units starting from the first time unit are downlink transmission time units and/or special time units starting from the first time unit.

In an implementation, the implementations disclosed in embodiments of this application may be applied to a time division duplex (TDD) system.

In an implementation, the first information is further used to indicate the time offset indicator n. By way of example and without limitation, the first information includes the time offset indicator n.

In an implementation, the terminal device receives second information, where the second information is used to configure the time offset indicator n.

In an implementation, a maximum value of the time offset indicator n is predefined, the maximum value of the time offset indicator n is configured by using higher layer signaling or media access control control element MAC CE signaling, or the maximum value of the time offset indicator n is determined based on an uplink/downlink time unit configuration.

In an implementation, the valid downlink transmission time unit is a time unit satisfying one or more of the following features:

the time unit is a special time unit and/or a downlink time unit;

a time domain resource offset between time domain resources occupied by the RS in the time unit and time domain resources occupied by the first information is greater than or equal to a processing delay of the RS, and the time domain resources occupied by the RS in the time unit are determined based on configuration information; or a quantity of time domain resources in the time unit that are allowed for receiving the RS is greater than or equal to a quantity of time domain resources occupied by the RS, and the quantity of time domain resources occupied by the RS is determined based on the configuration information.

In another implementation, the valid downlink transmission time units are time units, starting from the first time unit, available for downlink transmission, and satisfying the foregoing one or more features.

The foregoing two implementations help ensure that the valid downlink transmission time units can be used to transmit the RS, and a quantity of valid downlink transmission time units to be indicated by the time offset indicator n can be further reduced, thereby reducing the quantity of bits of the time offset indicator n.

In still another implementation, the valid downlink transmission time units are time unit, starting from the first time unit, available for downlink transmission, and satisfying the following one or more features: the time unit is a special time unit and/or a downlink time unit; and a time domain resource offset between time domain resources occupied by the RS in the time unit and time domain resources occupied by the first information is greater than or equal to a processing delay of the RS, and the time domain resources occupied by the RS in the time unit are determined based on configuration information.

In this implementation, when a quantity of time domain resources in the second time unit that are used for transmitting the RS is less than a quantity of time domain resources occupied by the RS, the terminal device may use, in the second time unit based on the configuration information, the time domain resources allowed for receiving the RS to receive some RSs. When a quantity of time domain resources in the second time unit that are used for transmitting the RS is greater than or equal to a quantity of the time domain resources occupied by the RS, the terminal device may use, in the second time unit based on the configuration information, time domain resources allowed for transmitting the RS to receive RSs.

For related content of the foregoing implementations, refer to the related implementations of the first aspect. A difference between this aspect and the first aspect lies in that the time offset indicator n indicates the valid downlink transmission time unit.

According to a fourth aspect, embodiments of this application provide a reference signal transmission method. The reference signal transmission method is described from the perspective of a network device side. A network device transmits first information in a first time unit, where the first information is used to indicate a terminal device to receive a reference signal RS; and the network device transmits the RS in a second time unit, where the second time unit is a time unit indicated by a time offset indicator n in valid downlink transmission time units starting from the first time unit.

In an implementation, the valid downlink transmission time unit is determined based on an uplink/downlink time unit configuration.

In an implementation, the first information is further used to indicate the time offset indicator n. By way of example and without limitation, the first information includes the time offset indicator n.

In an implementation, the network device transmits second information, where the second information is used to configure the time offset indicator n.

In an implementation, a maximum value of the time offset indicator n is predefined, the maximum value of the time offset indicator n is configured by using higher layer signaling or media access control control element MAC CE signaling, or the maximum value of the time offset indicator n is determined based on an uplink/downlink time unit configuration.

In an implementation, the valid downlink transmission time unit is a time unit satisfying one or more of the following features:

the time unit is a special time unit and/or a downlink time unit;

a time domain resource offset between time domain resources occupied by the RS in the time unit and time domain resources occupied by the first information is greater than or equal to a processing delay of the RS, and the time domain resources occupied by the RS in the time unit are determined based on configuration information; or a quantity of time domain resources in the time unit that are allowed for transmitting the RS is greater than or equal to a quantity of the time domain resources occupied by the RS, and the quantity of the time domain resources occupied by the RS is determined based on the configuration information.

For related descriptions of the foregoing implementations of this aspect, refer to the related implementations of the third aspect. Details are not described herein again.

According to a fifth aspect, embodiments of this application further provide a communication apparatus. The communication apparatus has some or all functions of the terminal device that implements the first aspect or the third aspect. For example, the apparatus may have functions in some or all embodiments of the terminal device in this application, or may have a function of independently implementing any embodiment in this application. The function may be implemented by hardware, or may be implemented by hardware by executing corresponding software. The hardware or the software includes one or more units or modules corresponding to the foregoing functions.

In a possible design, a structure of the communication apparatus may include a processing unit and a communication unit. The processing unit is configured to support the communication apparatus in performing a corresponding function in the foregoing methods. The communication unit is configured to support communication between the communication apparatus and another device. The communication apparatus may further include a storage unit. The storage unit is configured to be coupled to the processing unit and the communication unit, and stores program instructions and data that are necessary for the communication apparatus.

In an implementation, the communication apparatus includes:

a communication unit, configured to receive first information in a first time unit, where the first information is used to trigger the terminal device to transmit a reference signal RS.

The communication unit is configured to transmit the RS in a second time unit.

The second time unit is a time unit indicated by a time offset indicator n in valid uplink transmission time units starting from the first time unit.

For related content of this implementation, refer to the related content of the first aspect. Details are not described herein again. Optionally, the communication apparatus further includes a processing unit, configured to determine the second time unit based on the first time unit and the time offset indicator n.

For example, the communication unit may be a transceiver or a communication interface, the storage unit may be a memory, and the processing unit may be a processor.

In another implementation, the communication apparatus may include:

a transceiver, configured to receive first information in a first time unit, where the first information is used to trigger the terminal device to transmit a reference signal RS.

The transceiver is configured to transmit the RS in a second time unit.

The second time unit is a time unit indicated by a time offset indicator n in valid uplink transmission time units starting from the first time unit.

For related content of this implementation, refer to the related content of the first aspect. Details are not described herein again. Optionally, the communication apparatus further includes a processor, configured to determine the second time unit based on the first time unit and the time offset indicator n.

In still another implementation, the communication apparatus may include:

a communication unit, configured to receive first information in a first time unit, where the first information is used to indicate the terminal device to receive a reference signal RS.

The communication unit is further configured to receive the RS in a second time unit.

The second time unit is a time unit indicated by a time offset indicator n in valid downlink transmission time units starting from the first time unit.

For related content of this implementation, refer to the related content of the third aspect. Details are not described herein again. Optionally, the communication apparatus further includes a processor, configured to determine the second time unit based on the first time unit and the time offset indicator n.

In still another implementation, the communication apparatus may include:

a transceiver, configured to receive first information in a first time unit, where the first information is used to indicate the terminal device to receive a reference signal RS.

The transceiver is further configured to receive the RS in a second time unit.

The second time unit is a time unit indicated by a time offset indicator n in valid downlink transmission time units starting from the first time unit.

For related content of this implementation, refer to the related content of the third aspect. Details are not described herein again. Optionally, the communication apparatus further includes a processor, configured to determine the second time unit based on the first time unit and the time offset indicator n.

In an implementation process, the processor may be configured to perform, for example, but not limited to, baseband related processing, and the transceiver may be configured to perform, for example, but not limited to, radio frequency receiving and transmitting. The foregoing components may be separately disposed on chips independent of each other, or at least some or all of the components may be disposed on one chip. For example, the processor may be further divided into an analog baseband processor and a digital baseband processor. The analog baseband processor and the transceiver may be integrated on a same chip, and the digital baseband processor may be disposed on an independent chip. With the continuous development of integrated circuit technologies, more devices can be integrated on a same chip. For example, a digital baseband processor may be integrated with a variety of application processors (for example, but not limited to, a graphics processor and a multimedia processor) on the same chip. Such a chip may be referred to as a system on chip. Whether all the components are separately disposed on different chips or integrated and disposed on one or more chips usually depends on a requirement for a product design. Implementations of the foregoing components are not limited in this embodiment of this application.

According to a sixth aspect, embodiments of this application further provide a communication apparatus. The communication apparatus has some or all functions of the network device that implements the method example according to the second aspect or the fourth aspect. For example, the communication apparatus may have functions in some or all embodiments in this application, or may have a function of independently implementing any embodiment in this application. The function may be implemented by hardware, or may be implemented by hardware by executing corresponding software. The hardware or the software includes one or more units or modules corresponding to the foregoing functions.

In a possible design, a structure of the communication apparatus may include a processing unit and a communication unit. The processing unit is configured to support the communication apparatus in performing a corresponding function in the foregoing methods. The communication unit is configured to support communication between the communication apparatus and another device. The communication apparatus may further include a storage unit. The storage unit is configured to be coupled to the processing unit and the communication unit, and stores program instructions and data that are necessary for the communication apparatus.

In an implementation, the communication apparatus includes:

a communication unit, configured to transmit first information in a first time unit, where the first information is used to trigger a terminal device to transmit a reference signal RS.

The communication unit is further configured to receive the RS in a second time unit.

The second time unit is a time unit indicated by a time offset indicator n in valid uplink transmission time units starting from the first time unit.

For related content of this implementation, refer to the related content of the second aspect. Details are not described herein again. Optionally, the communication apparatus further includes a processing unit, configured to determine the first time unit based on the second time unit, where the second time unit is a time unit used by the terminal device to transmit the RS. The communication unit may be a communication interface or an interface.

For example, the processing unit may be a processor, the communication unit may be a transceiver or a communication interface, and the storage unit may be a memory.

In another implementation, the communication apparatus includes:

a transceiver, configured to transmit first information in a first time unit, where the first information is used to trigger a terminal device to transmit a reference signal RS.

The transceiver is further configured to receive the RS in a second time unit.

The second time unit is a time unit indicated by a time offset indicator n in valid uplink transmission time units starting from the first time unit.

For related content of this implementation, refer to the related content of the second aspect. Details are not described herein again. Optionally, the communication apparatus further includes a processing unit, configured to determine the first time unit based on the second time unit. The second time unit is a time unit used by the terminal device to transmit the RS.

In an implementation, the communication apparatus includes:

a communication unit, configured to transmit first information in a first time unit, where the first information is used to indicate a terminal device to receive a reference signal RS.

The communication unit is further configured to transmit the RS in a second time unit.

The second time unit is a time unit indicated by a time offset indicator n in valid downlink transmission time units starting from the first time unit.

For related content of this implementation, refer to the related content of the fourth aspect. Details are not described herein again. Optionally, the communication apparatus further includes a processing unit, configured to determine the second time unit and the first time unit. The second time unit is a time unit used by the terminal device to receive the RS or transmit the RS. The communication unit may be a communication interface or an interface.

For example, the processing unit may be a processor, the communication unit may be a transceiver or a communication interface, and the storage unit may be a memory.

In another implementation, the communication apparatus includes:

a transceiver, configured to transmit first information in a first time unit, where the first information is used to indicate a terminal device to receive a reference signal RS.

The transceiver is further configured to transmit the RS in a second time unit.

The second time unit is a time unit indicated by a time offset indicator n in valid downlink transmission time units starting from the first time unit.

For related content of this implementation, refer to the related content of the fourth aspect. Details are not described herein again. Optionally, the communication apparatus further includes a processor, configured to determine the second time unit and the first time unit. The second time unit is a time unit used by the terminal device to receive the RS or transmit the RS.

In an implementation process, the processor may be configured to perform, for example, but not limited to, baseband related processing, and the transceiver may be configured to perform, for example, but not limited to, radio frequency reception and transmission. The foregoing components may be separately disposed on chips independent of each other, or at least some or all of the components may be disposed on one chip. For example, the processor may be further divided into an analog baseband processor and a digital baseband processor. The analog baseband processor and the transceiver may be integrated on a same chip, and the digital baseband processor may be disposed on an independent chip. With the continuous development of integrated circuit technologies, more devices can be integrated on a same chip. For example, a digital baseband processor may be integrated with a variety of application processors (for example, but not limited to, a graphics processor and a multimedia processor) on the same chip. Such a chip may be referred to as a system on chip. Whether all the components are separately disposed on different chips or integrated and disposed on one or more chips usually depends on a requirement for a product design. Implementations of the foregoing components are not limited in this embodiment of this application.

According to a seventh aspect, embodiments of this application further provide a processor, configured to perform the foregoing methods. In a process of performing these methods, a process of transmitting the foregoing information and a process of receiving the foregoing information in the foregoing methods may be understood as a process of outputting the foregoing information by the processor and a process of receiving the foregoing input information by the processor. When outputting the foregoing information, the processor outputs the foregoing information to a transceiver, so that the transceiver performs transmission. After the foregoing information is output by the processor, other processing may further need to be performed before the information reaches the transceiver. Similarly, when the processor receives the input information, the transceiver receives the information and inputs the information into the processor. Still further, after the transceiver receives the information, other processing may need to be performed on the information before the information is input into the processor.

Based on the foregoing principle, for example, transmitting the first information or the RS mentioned in the foregoing methods may be understood as outputting the first information or the RS by the processor. For another example, receiving the first information or the RS may be understood as receiving the input first information or RS by the processor.

For operations such as transmission, transmitting, and receiving related to the processor, if there is no particular statement, or if the operations do not contradict an actual function or internal logic of the operations in related descriptions, the operations may be more generally understood as operations such as output, receiving, and input of the processor, instead of operations such as transmission, transmitting, and receiving directly performed by a radio frequency circuit and an antenna.

In an implementation process, the processor may be a processor specially configured to perform these methods, or a processor, for example, a general-purpose processor, that executes computer instructions in a memory to perform these methods. The memory may be a non-transitory memory, for example, a read only memory (ROM). The memory and the processor may be integrated on a same chip, or may be separately disposed on different chips. A type of the memory and a manner of disposing the memory and the processor are not limited in embodiments of this application.

According to an eighth aspect, embodiments of this application further provide a communication system. The system includes at least one terminal device and at least one network device in the foregoing aspects. In another possible design, the system may further include another device that interacts with the terminal or the network device in the solutions provided in embodiments of this application.

According to a ninth aspect, embodiments of this application provide a computer-readable storage medium, configured to store computer software instructions. When the instructions are executed by a computer, the method according to the first aspect or the third aspect is implemented.

According to a tenth aspect, embodiments of this application provide a computer-readable storage medium, configured to store computer software instructions. When the instructions are executed by a computer, a communication apparatus is enabled to implement the method according to the second aspect or the fourth aspect.

According to an eleventh aspect, embodiments of this application further provide a computer program product including instructions. When the computer program product runs on a computer, the computer is enabled to perform the method according to the first aspect or the third aspect.

According to a twelfth aspect, embodiments of this application further provide a computer program product including instructions. When the computer program product runs on a computer, the computer is enabled to perform the method according to the second aspect or the fourth aspect.

According to a thirteenth aspect, embodiments of this application provide a chip system. The chip system includes a processor and an interface. The interface is configured to obtain a program or instructions. The processor is configured to invoke the program or the instructions to implement or support a terminal device in implementing functions in the first aspect or the third aspect, for example, determining or processing at least one of data and information in the foregoing methods.

In a possible design, the chip system further includes a memory. The memory is configured to store program instructions and data that are necessary for the terminal device. The chip system may include a chip, or may include a chip and another discrete device.

According to a fourteenth aspect, embodiments of this application provide a chip system. The chip system includes a processor and an interface. The interface is configured to obtain a program or instructions. The processor is configured to invoke the program or the instructions to implement or support a network device in implementing functions in the second aspect or the fourth aspect, for example, determining or processing at least one of data and information in the foregoing methods.

In a possible design, the chip system further includes a memory. The memory is configured to store program instructions and data that are necessary for the network device. The chip system may include a chip, or may include a chip and another discrete device.

DESCRIPTION OF EMBODIMENTS

Figure 1:
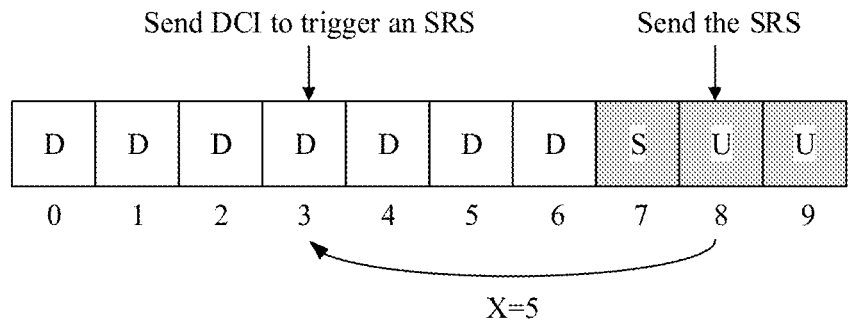
FIG. 1 is a schematic diagram of an SRS trigger method.

The following describes technical solutions in embodiments of this application with reference to the accompanying drawings.

The technical solutions in embodiments of this application can be applied to various communication systems. For example, with the continuous development of communication technologies, the technical solutions in embodiments of this application may be further applied to a future network, for example, a 5G system which may also be referred to as a new radio (NR) system; or may alternatively be applied to a device to device (D2D) system, a machine to machine (M2M) system, or the like.

In embodiments of this application, a network device may be a device having a radio transceiver function or a chip that may be disposed on the device. The network device includes but is not limited to an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), an access point (AP) in a wireless fidelity (Wi-Fi) system, a wireless relay node, a wireless backhaul node, a transmission point (TRP or TP). Alternatively, the network device may be a device used in a 5G, 6G, or even 7G system, for example, a gNB in an NR system, a transmission point (TRP or TP), or one antenna panel or a group of antenna panels (including a plurality of antenna panels) of a base station in the 5G system. Alternatively, the network device may be a network node that constitutes a gNB or a transmission point, for example, a baseband unit (BBU), a distributed unit (DU), a picocell, a femtocell, or a road side unit (RSU) in an internet of vehicles (V2X) or an intelligent driving scenario.

In some deployments, the network device may include a centralized unit (CU), a distributed unit (DU), and the like. The network device may further include a radio unit (RU). The CU implements some functions of the network device, and the DU implements some functions of the network device. For example, the CU implements functions of a radio resource control (RRC) layer and a packet data convergence protocol (PDCP) layer, and the DU implements functions of a radio link control (RLC) layer, a media access control (MAC) layer, and a physical (PHY) layer. Information at the RRC layer finally becomes information at the physical layer or is transformed from information at the physical layer. Therefore, in such an architecture, it may be considered that higher layer signaling such as RRC layer signaling or PHCP layer signaling is sent by the DU or is sent by the DU and the RU. It can be understood that the network device may be a CU node, a DU node, or a device including a CU node and a DU node. In addition, the CU may be classified as a network device in an access network RAN, or the CU may be classified as a network device in a core network (CN). This is not limited herein.

In the embodiments disclosed in this application, an apparatus configured to implement network device functions may be a network device, or may be an apparatus that can support the network device in implementing the functions, for example, a chip system. The apparatus may be installed in the network device.

In the embodiments disclosed in this application, the technical solutions provided in the embodiments disclosed in this application are described by using an example in which an apparatus configured to implement a function of the network device is a network device, and the network device is a base station.

In embodiments of this application, the terminal device may also be referred to as user equipment (UE), an access terminal, a subscriber unit, a subscriber station, a mobile station, a remote station, a remote terminal, a mobile device, a user terminal, a user agent, or a user apparatus. The terminal device in embodiments of this application may be a mobile phone, a tablet computer (Pad), a computer having a wireless transceiver function, a virtual reality (VR) terminal device, an augmented reality (AR) terminal device, a wireless terminal in industrial control), a wireless terminal in self driving, a wireless terminal in remote medical, a wireless terminal in a smart grid, a wireless terminal in transportation safety, a wireless terminal in a smart city, a wireless terminal in a smart home, a wireless terminal in V2X internet of vehicles, an RSU of a wireless terminal type, or the like.

For ease of understanding the embodiments disclosed in this application, the following descriptions are provided.

(1) In the embodiments disclosed in this application, an NR network scenario in a wireless communication network is used to describe some scenarios. It should be noted that the solutions in the embodiments disclosed this application may be further applied to another wireless communication network, and a corresponding name may also be replaced with a name of a corresponding function in the another wireless communication network.

(2) The embodiments disclosed in this application present aspects, embodiments, or features of this application around a system including a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

(3) In the embodiments disclosed in this application, the term "example" is used to represent an example, illustration, or illustration. Any embodiment or design scheme described as an "example" in this application should not be explained as being more preferred or having more advantages than another embodiment or design scheme. Exactly, the term "example" is used to present a concept in a specific manner.

(4) In the embodiments disclosed in this application, "of", "relevant", and "corresponding" may sometimes be interchangeably used. It should be noted that, when a difference is not emphasized, the meanings that they are intended to convey are the same.

(5) "At least one" in the embodiments disclosed in this application may alternatively be described as one or more, and "a plurality of" means two, three, four, or more. This is not limited in embodiments of this application. In the embodiments disclosed in this application, technical features in a type of technical features are distinguished by using "first", "second", "third", and the like. The technical features described by "first", "second", and "third" have no sequence or size sequence.

For ease of description, several concepts related to embodiments of this application are first described.
1. Reference Signal A reference signal (RS) includes, for example, but not limited to, a channel state information reference signal (CSI-RS), a synchronous signal and PBCH block (SSB), and a sounding reference signal (SRS). A tracking reference signal (TRS) is also a type of CSI-RS.

The network device obtains channel state information for uplink transmission or downlink transmission through the reference signal, to configure a corresponding modulation and coding scheme, corresponding precoding information, and the like for the terminal device.

In some implementations, the network device may trigger the terminal device to transmit the reference signal such as the SRS, to obtain the channel state information for uplink transmission. The network device may indicate the terminal device to receive the reference signal such as the CSI-RS, to obtain the channel state information for downlink transmission.

2. First Information

In an implementation, the first information may be carried in, for example, but not limited to, downlink control information (DCI), downlink control signaling, media access control control element (MAC-CE) signaling, RRC signaling, or other higher layer signaling, and the first information is used to trigger the terminal device to transmit the reference signal. The first information may be a trigger indication, and the trigger indication is used to trigger the terminal device to transmit the reference signal.

In another implementation, the first information is, for example, but not limited to, downlink control information (DCI), downlink control signaling, media access control control element (MAC-CE) signaling, RRC signaling, or other higher layer signaling. The first information is used to trigger the terminal device to transmit the reference signal.

The higher layer signaling may be, for example, but not limited to, one or more of terminal device-specific radio resource control signaling, cell-specific radio resource control signaling, or a higher layer parameter.

3. First Time Unit and Second Time Unit

The first time unit is a time unit in which the first information is located. Alternatively, the first time unit is a time unit in which a control channel is detected, where the control channel carries the first information.

The second time unit is a time unit used by the terminal device to transmit the RS. A time offset indicator n is used to indicate the second time unit. The second time unit is a time unit indicated by the time offset indicator n in valid uplink transmission time units starting from the first time unit.

In an implementation, the valid uplink transmission time units are time units allowed for (available for, or capable for) uplink transmission. Alternatively, the valid uplink transmission time units are time units allowed for (available for, or capable for) uplink transmission of the RS.

4. Time Unit, Uplink Time Unit, Downlink Time Unit, and Special Time Unit

The time unit is, for example, but not limited to, a time window such as a system information (SI) window, including one or more radio frames, one or more subframes, one or more slots, one or more mini-slots, one or more subslots, one or more symbols, or a plurality of frames or subframes. A time length of a symbol is not limited. A length of a symbol may vary with different subcarrier spacings.

A time domain resource is, for example, but not limited to, one or more OFDM symbols. For example, time domain resources occupied by the RS may be indicated by using a start symbol (or a start location) and a quantity of symbols that are configured by the network device.

Symbols include uplink symbols and downlink symbols. The uplink symbols may be referred to as single-carrier frequency division multiple access (SC-FDMA) symbols or orthogonal frequency division multiplexing (OFDM) symbols. The downlink symbols may be OFDM symbols.

A communication system divides time units in time domain into at least one of uplink time units, downlink time units, or special time units based on an uplink/downlink time unit configuration.

The uplink time unit is a time unit including time domain resources used for uplink transmission. The downlink time unit is a time unit including time domain resources used for downlink transmission.

The special time unit is a time unit including time domain resources used for uplink-downlink switching. The special time unit includes, for example, but not limited to, time domain resources used for uplink-downlink switching and time domain resources used for downlink transmission, or time domain resources used for uplink-downlink switching and time domain resources used for uplink transmission, or time domain resources used for uplink-downlink switching, or time domain resources used for downlink transmission and time domain resources used for uplink transmission.

Figure 2:
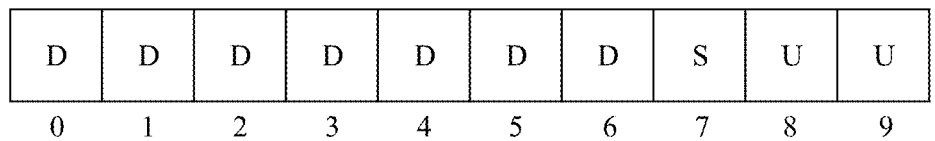
FIG. 2 is a schematic diagram of slots divided based on an uplink/downlink slot configuration according to an embodiment of this application.

For example, it is assumed that the time unit is a slot. FIG. 2 is a schematic diagram of slots divided based on an uplink/downlink slot configuration according to an embodiment of this application. D represents a downlink slot, U represents an uplink slot, and S represents a special slot. In FIG. 2, slot 0 to slot 6 are downlink slots, slot 7 is a special slot, and slot 8 and slot 9 are uplink slots.

In an implementation of embodiments of this application, a terminal device receives first information in a first time unit, where the first information is used to trigger the terminal device to transmit a reference signal RS. The terminal device transmits the RS in a second time unit. The second time unit is a time unit indicated by a time offset indicator n in valid uplink transmission time units starting from the first time unit.

The technical solutions described in embodiments of this application may be applied to a time division duplex (TDD) system.

It can be learned that the time offset indicator n indicates a time unit in the valid uplink transmission time units. Bit overheads of the time offset indicator n are less than those required in a manner in which the time offset indicator n indicates a time offset between the first time unit and the second time unit.

In addition, in this implementation, flexibility of selecting the first time unit (namely, flexibility of triggering the RS) is implemented. In this way, on one hand, it helps the network device select a time unit that carries data scheduling control information as the first time unit, to merely trigger the terminal device to transmit the RS by using the data scheduling control information, thereby avoiding a resource waste caused by transmitting extra first information to specially trigger the terminal device to transmit the RS. On the other hand, it helps the network device transmit, in different first time units, first information that triggers a plurality of terminal devices to separately transmit the RS, thereby avoiding control channel congestion caused by transmitting the first information in a same first time unit.

Figure 3:
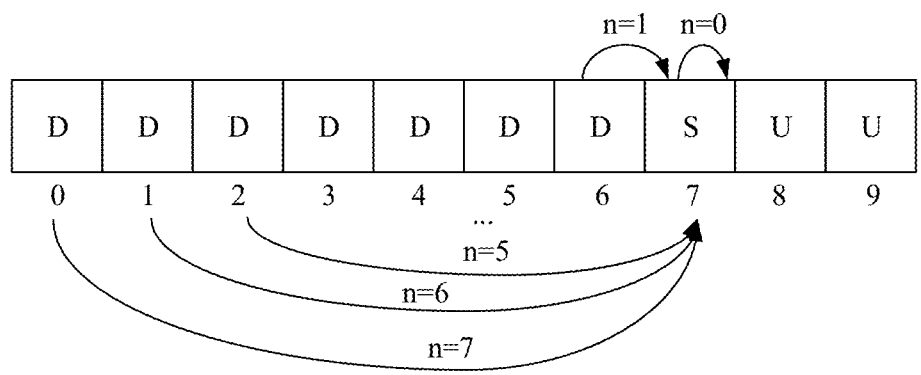
FIG. 3 is a schematic diagram in which a time offset indicator n is used to indicate a time offset according to an embodiment of this application.

However, in the manner in which the time offset indicator n indicates the time offset between the first time unit and the second time unit, the time offset between the first time unit and the second time unit varies with different first time units. To implement the flexibility of selecting the first time unit, overheads of the time offset indicator n are large. As shown in FIG. 3, for example, the time unit is a slot, and the second time unit is slot 7. To enable that any one of slot 0 to slot 7 can be used to trigger the RS, the time offset indicator n needs to be able to separately indicate a time offset between slot 7 and any one of slot 0 to slot 7. It can be learned that a value range of the time offset indicator n needs to range from 0 to 7, that is, three bits are required to completely indicate the time offset.

Figure 4:
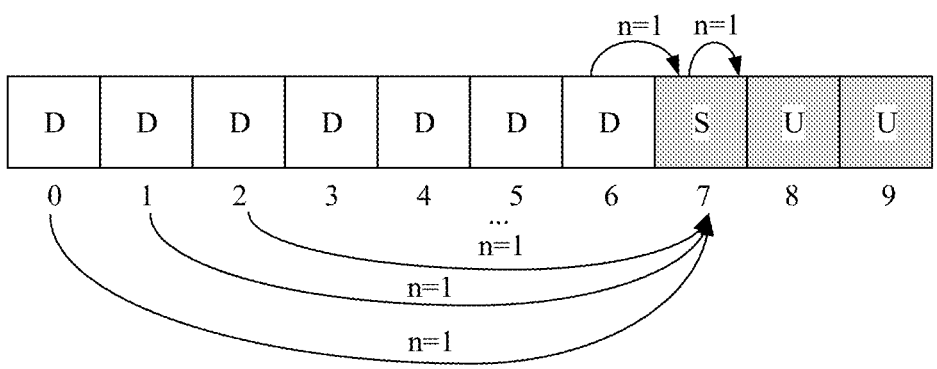
FIG. 4 is a schematic diagram in which a time offset indicator n is used to indicate valid uplink transmission time units according to an embodiment of this application.

In an implementation of embodiments of this application, as shown in FIG. 4, for example, the time unit is a slot. It is assumed that the second time unit is slot 7, and the valid uplink transmission time units are slot 7, slot 8, and slot 9 in FIG. 4. The second time unit indicated by the time offset indicator n is a time unit in the valid uplink transmission time units starting from the first time unit. In this case, the time offset indicator n requires two bits to completely indicate slot 7 to slot 9. It is assumed that n is 00, indicating the first slot, namely, slot 7; n is 01, indicating the second slot, namely, slot 8; and n is 10, indicating the third slot, namely, slot 9. In this case, slot 7 is the first slot in the valid uplink transmission slots starting from any one of slot 0 to slot 7. In other words, slot 7 can be determined if n is 00.

It can be learned that, in the implementation of FIG. 4, two bits are required by the time offset indicator n to indicate the second time unit, but in FIG. 3, three bits are required by the time offset indicator n to indicate the second time unit. Therefore, in the implementation shown in FIG. 4, overheads of the time offset indicator n are fewer.

In addition, as shown in FIG. 4, when a slot (namely, slot 7) used to transmit the RS and the time offset indicator n remain unchanged, slot 7 and any one of slot 0 to slot 6 before slot 7 may be used to trigger the terminal device to transmit the RS in slot 7. This greatly increases the flexibility of selecting the first time unit. However, in FIG. 3, once a slot used to transmit the RS and the time offset indicator n are determined, a corresponding first time unit is also determined. Even if control information for scheduling data is not configured in the first time unit, the first information needs to be sent in the first time unit to trigger the terminal device to transmit the RS. Therefore, compared with the implementation shown in FIG. 3, the implementation shown in FIG. 4 helps reduce overheads of the first information. For example, when the first information is DCI, this implementation helps reduce overheads of a physical downlink control channel (PDCCH) that carries the DCI.

In addition, in the implementations disclosed in embodiments of this application, when a plurality of terminal devices are required by the network device to transmit the RS in the second time unit, the network device may flexibly use a plurality of first time units to separately trigger the terminal devices to transmit the RS. This avoids a congestion problem caused when the time offset indicator n and the second time unit are relatively determined, only a same first time unit can be selected to trigger the plurality of terminal devices to transmit the RS, and the network device needs to transmit a plurality of pieces of first information in the same first time unit.

Figure 5:
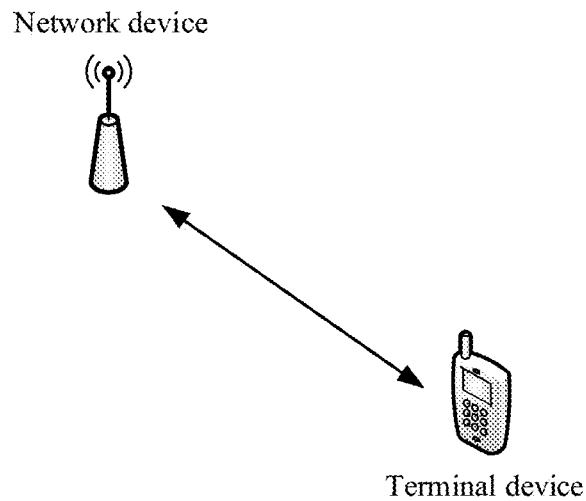
FIG. 5 is a schematic diagram of a structure of a communication system according to an embodiment of this application.

FIG. 5 is a schematic diagram of a structure of a communication system according to an embodiment of this application. As shown in FIG. 5, during communication between a terminal device and a network device, the network device can obtain uplink channel information by measuring an RS sent by the terminal device. In a TDD system, the network device can obtain downlink channel information based on reciprocity of uplink and downlink channel information. Alternatively, the terminal device may measure an RS sent by the network device and report a measured result to the network device, so that the network device obtains channel state information for downlink transmission. In a TDD system, the terminal device can obtain uplink channel information based on reciprocity of uplink and downlink channel information.

Based on the communication system shown in FIG. 5, the following illustrates a transmission method of a reference signal for measuring an uplink channel with reference to FIG. 6 to FIG. 16. FIG. 2, FIG. 3, FIG. 4, FIG. 7, FIG. 9, and FIG. 11 have a same uplink/downlink slot configuration. FIG. 8, FIG. 10, FIG. 14, FIG. 15, FIG. 16, FIG. 18, and FIG. 19 have a same uplink/downlink slot configuration. Slots are used as an example in FIG. 4 to FIG. 11. Valid uplink transmission slots are slots available for uplink transmission, such as special slots and uplink slots.

A difference between a transmission method of a reference signal for measuring a downlink channel and the transmission method of a reference signal for measuring an uplink channel lies in that, determining "valid uplink transmission slots" in related examples in the transmission method of a reference signal for measuring an uplink channel needs to be modified to determining "valid downlink transmission slots". For related content, refer to FIG. 17 to FIG. 19.

Figure 6:
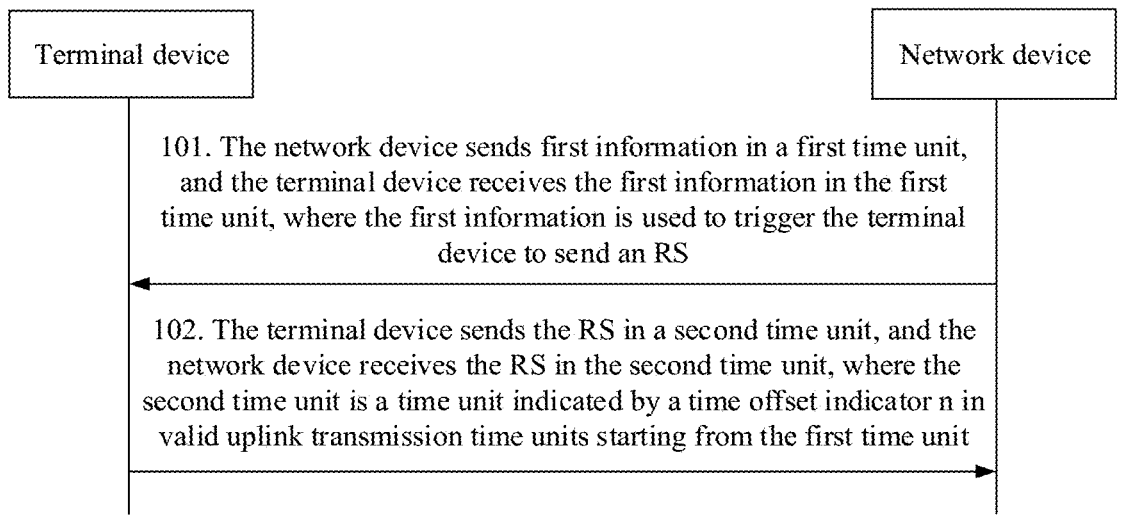
FIG. 6 is a schematic flowchart of a reference signal transmission method according to an embodiment of this application.

FIG. 6 is a schematic flowchart of a reference signal transmission method according to an embodiment of this application. As shown in FIG. 6, the reference signal transmission method may include the following steps.

101. A network device transmits first information in a first time unit, and the terminal device receives the first information in the first time unit, where the first information is used to trigger the terminal device to transmit an RS.

102. The terminal device transmits the RS in a second time unit, and the network device receives the RS in the second time unit.

The second time unit is a time unit indicated by a time offset indicator n in valid uplink transmission time units starting from the first time unit. The following illustrates the time unit indicated by the time offset indicator n by using some implementations.

In an implementation, the second time unit is an $m^{th}$ time unit in the valid uplink transmission time units starting from the first time unit. m is equal to n+1, and n+1 indicates a value of the time offset indicator n plus 1. m is used to indicate an ordering of the second time unit in the valid uplink transmission time units starting from the first time unit.

Figure 7:
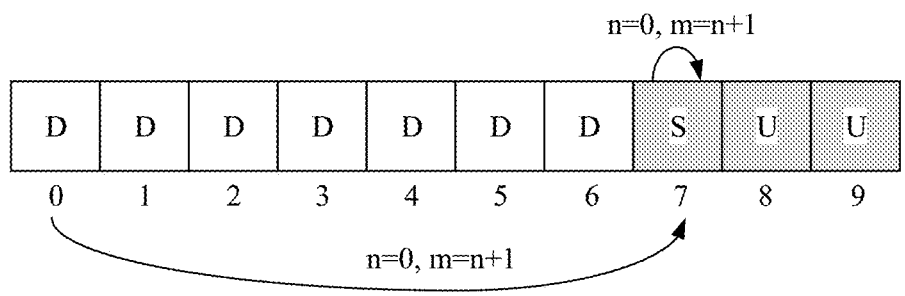
FIG. 7 is a schematic diagram of a reference signal transmission method according to an embodiment of this application.

For example, as shown in FIG. 7, it is assumed that the first time unit is slot 0; the valid uplink transmission time units starting from slot 0 are slot 7, slot 8, and slot 9; the value of the time offset indicator n is 0; and the first information is DCI. The network device transmits DCI in slot 0, where the DCI is used to trigger the terminal device to transmit the RS. The terminal device receives the DCI in slot 0. The terminal device transmits the RS in the first time unit (that is, m is equal to 1, and the value of n is 0), namely, slot 7, in the valid uplink transmission time units (namely, slot 7, slot 8, and slot 9) starting from slot 0. The network device receives the RS in slot 7, to obtain channel state information for uplink transmission.

For another example, as shown in FIG. 7, it is assumed that the first time unit is slot 7, and the value of the time offset indicator n is 0. The network device transmits DCI in slot 7, where the DCI is used to trigger the terminal device to transmit the RS. The terminal device receives the DCI in slot 7. The first time unit in the valid uplink transmission time units (namely, slot 7, slot 8, and slot 9) starting from slot 7 is slot 7. Therefore, the terminal device transmits the RS in slot 7, and the network device receives the RS in slot 7, to obtain channel state information for downlink transmission.

It can be learned that, in the examples shown in FIG. 7, when the time offset indicator (for example, the value of the time offset indicator n is 0) and the second time unit (for example, the second time unit is slot 7) remain unchanged, the first time unit can be flexibly selected (for example, any one of slot 0 to slot 7 can be used to trigger the terminal device to transmit the RS). In this way, on one hand, it helps the network device select a time unit that carries data scheduling control information as the first time unit, to merely trigger the terminal device to transmit the RS by using the data scheduling control information, thereby avoiding a resource waste caused by transmitting extra first information to specially trigger the terminal device to transmit the RS. On the other hand, it helps the network device transmit, in different first time units, first information that triggers a plurality of terminal devices to separately transmit the RS, thereby avoiding control channel congestion caused by transmitting the plurality of pieces of first information in a same first time unit.

Figure 8:
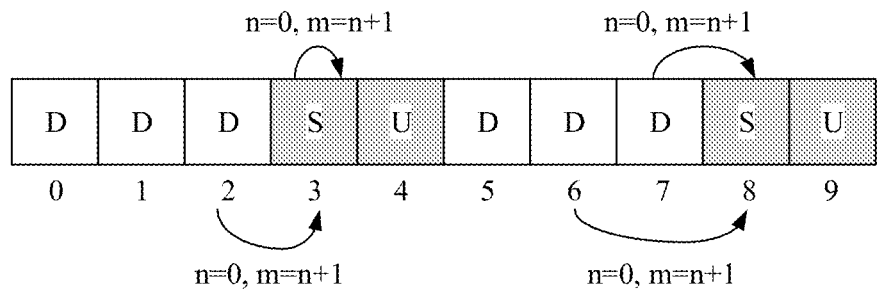
FIG. 8 is another schematic diagram of a reference signal transmission method according to an embodiment of this application.

FIG. 8 is a schematic diagram of slots divided based on another uplink/downlink slot configuration according to an embodiment of this application. In the schematic diagram of the slots shown in FIG. 8, D represents a downlink slot, U represents an uplink slot, and S represents a special slot. As shown in FIG. 8, it is assumed that the first time unit is slot 2, the value of the time offset indicator n is 0, and m is equal to 1. The network device transmits DCI in slot 2, where the DCI is used to trigger the terminal device to transmit the RS. The terminal device receives the DCI in slot 2, and determines that valid uplink transmission slots starting from slot 2 are slot 3, slot 4, slot 8, and slot 9. The terminal determines, based on the value of the time offset indicator n, namely, 0, that the first slot in the valid uplink transmission slots starting from slot 2 is slot 3, and transmits the RS in slot 3. The network device receives the RS in slot 3.

For another example, as shown in FIG. 8, it is assumed that the first time unit is slot 3, the value of the time offset indicator n is 0, and m is equal to 1. Valid uplink transmission slots starting from slot 3 are slot 3, slot 4, slot 8, and slot 9. Therefore, the terminal device determines, based on the time offset indicator n, that the first slot in the valid uplink transmission slots starting from slot 3 is still slot 3. That is, the terminal device receives DCI in slot 3, where the DCI is used to trigger the terminal device to transmit the RS. The terminal device further transmits the RS in slot 3, and the network device receives the RS also in slot 3.

For another example, as shown in FIG. 8, it is assumed that the first time unit is slot 6, the value of the time offset indicator n is 0, and m is equal to 1. Valid uplink transmission slots starting from slot 6 are slot 8 and slot 9. The terminal device determines that the first slot in the valid uplink transmission slots starting from slot 6 is slot 8. That is, the terminal device receives DCI in slot 6, where the DCI is used to trigger the terminal device to transmit the RS. The terminal device transmits the RS in slot 8. The network device receives the RS also in slot 8.

For another example, as shown in FIG. 8, it is assumed that the first time unit is slot 7, the value of the time offset indicator n is 0, and m is equal to 1. Valid uplink transmission slots starting from slot 7 are slot 8 and slot 9. The terminal device determines that the first slot in the valid uplink transmission slots starting from slot 7 is slot 8. That is, the terminal device receives DCI in slot 7, where the DCI is used to trigger the terminal device to transmit the RS. The terminal device transmits the RS in slot 8. The network device receives the RS also in slot 8.

It can be learned that although the schematic diagram of the slots shown in FIG. 8 is different from the schematic diagram of the slots shown in FIG. 7, based on the schematic diagram of the slots shown in FIG. 8, the first time unit can also be flexibly selected and bit overheads of the time offset indicator n can also be reduced. A schematic diagram of related slots in embodiments disclosed in this application is used as an example for description, and an uplink/downlink slot configuration is not limited.

In an implementation, the second time unit is an $m^{th}$ time unit in the valid uplink transmission time units starting from the first time unit. m is the value of the time offset indicator n. The time offset indicator n is not equal to 0.

Figure 9:
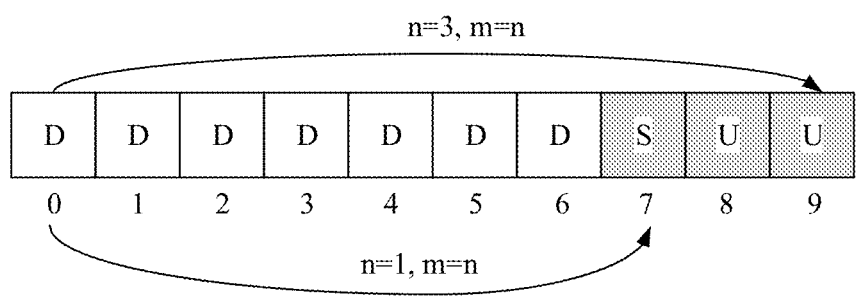
FIG. 9 is still another schematic diagram of a reference signal transmission method according to an embodiment of this application.

As shown in FIG. 9, assuming that the first time unit is slot 0, the value of the time offset indicator n is 1, and m is equal to 1, the second time unit is the first slot, namely, slot 7, in the valid uplink transmission slots starting from slot 0. Assuming that the first time unit is slot 0, the time offset indicator n is 3, and m is equal to 3, the second time unit is the third slot, namely, slot 9, in the valid uplink transmission slots starting from slot 0.

In an implementation, the second time unit is an $m^{th}$ time unit in the valid uplink transmission time units starting from the first time unit. There is a correspondence between the value of m and the value of the time offset indicator n. For example, the correspondence may be determined based on an order of index numbers of optional values of m and an order of optional values of n. The optional values or a value range of m may be predefined, configured by using higher layer signaling, or configured by using MAC-CE signaling.

For example, the higher layer signaling configures that the values of m belong to a set M, the set M is {1, 3, 4, 5}, and the possible values of the time offset indicator n are 0, 1, 2, and 3. In this case, the correspondence between the values of m and the values of the time offset indicator n is as follows: m is a value of an $(n+1)^{th}$ element in the set M.

Figure 10:
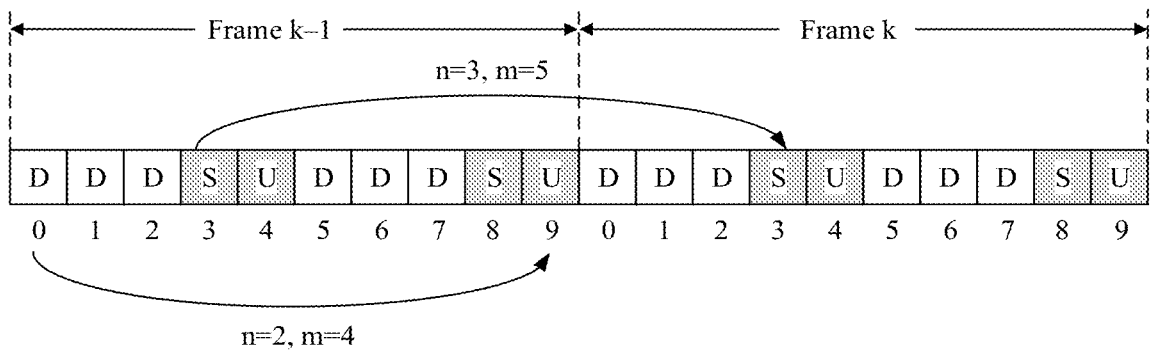
FIG. 10 is still another schematic diagram of a reference signal transmission method according to an embodiment of this application.

As shown in FIG. 10, it is assumed that the first time unit is slot 0 in frame k−1, and the value of the time offset indicator n is 2. In this case, m is the third element in the corresponding set M, that is, m=4. The second time unit is the fourth slot, namely, slot 9 in frame k−1, in valid uplink transmission slots starting from slot 0 in frame k−1. For another example, as shown in FIG. 10, it is assumed that the first time unit is slot 3 in frame k−1, and the value of the time offset indicator n is 3. In this case, m is the fourth element in the corresponding set M, that is, m=5. The second time unit is the fifth slot, namely, slot 3 in frame k, in valid uplink transmission slots starting from slot 3 in frame k−1.

In still another implementation, the second time unit is an $m^{th}$ time unit in the valid uplink transmission time units starting from the first time unit. When the first time unit is a special time unit, m is equal to the value of n plus 1, that is, m=n+1. When the first time unit is a downlink time unit, m is equal to the value of n, that is, m=n, and n is not equal to 0.

Figure 11:
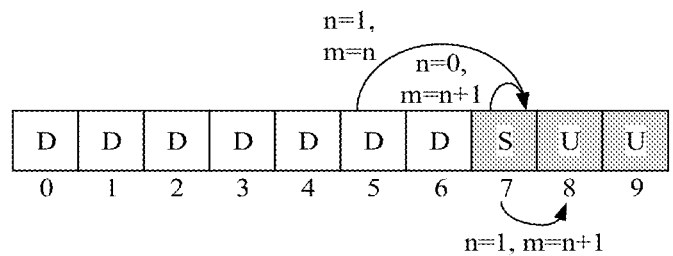
FIG. 11 is still another schematic diagram of a reference signal transmission method according to an embodiment of this application.

For example, in a schematic diagram of slots shown in FIG. 11, it is assumed that the first time unit is slot 7 and the value of the time offset indicator n is 0. Because slot 7 is a special time unit, m=n+1=1. The second time unit is the first slot, namely, slot 7, in valid uplink transmission slots starting from slot 7. It is assumed that the first time unit is slot 7, and the value of the time offset indicator n is 1, thus m=n+1=1+1=2. The second time unit is the second slot, namely, slot 8, in valid uplink transmission slots starting from slot 7. It is assumed that the first time unit is slot 5, and the value of the time offset indicator n is 1. Because the first time unit is a downlink time unit, m=n=1. The second time unit is the first slot (m=n=1), namely, slot 7, in valid uplink transmission slots starting from slot 5.

It can be learned that, in the schematic diagrams of the slots shown in FIG. 7 to FIG. 11, when the second time unit and the time offset indicator n are the same, the first time units may be different, that is, the first time units for triggering the RS may be flexibly selected. In addition, in the schematic diagrams of the slots shown in FIG. 7 to FIG. 11, a quantity of valid uplink transmission slots between the first time unit and the second time unit is less than a quantity of slots between the first time unit and the second time unit, so that overheads of bits occupied by the time offset indicator n are reduced.

Figure 12:
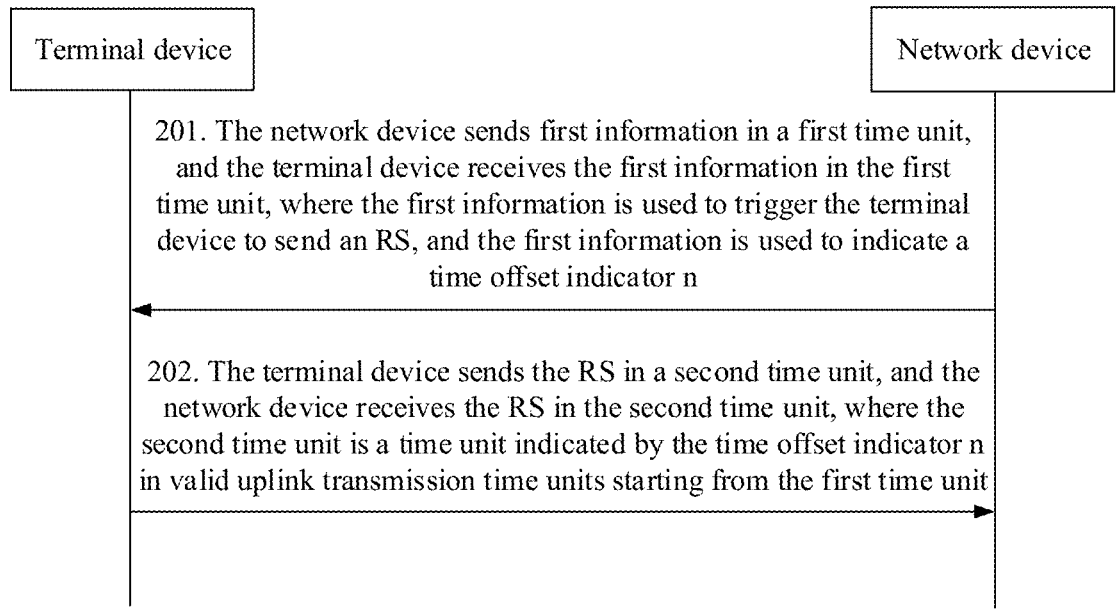
FIG. 12 is a schematic flowchart of another reference signal transmission method according to an embodiment of this application.

FIG. 12 is a schematic flowchart of another reference signal transmission method according to an embodiment of this application. A difference between the reference signal transmission method shown in FIG. 12 and the reference signal transmission method shown in FIG. 6 lies in that first information in FIG. 12 is further used to indicate a time offset indicator n.

201. A network device transmits the first information in a first time unit, where the first information is used to trigger a terminal device to transmit an RS, and the first information is further used to indicate the time offset indicator n; and the terminal device receives the first information in the first time unit.

In an implementation, the first information is, for example, but not limited to, DCI, downlink control signaling, MAC-CE signaling, RRC signaling, or other higher layer signaling.

In this implementation, the terminal device may determine the time offset indicator n based on, for example, but not limited to, a time offset indicator field or a trigger indication field carried in the first information.

In another implementation, the first information may be included in DCI, downlink control signaling, MAC-CE signaling, RRC signaling, or other higher layer signaling. The first information may be used to trigger the terminal device to transmit the RS, and may further be used to determine the time offset indicator n.

In this embodiment of this application, the time offset indicator n may be an explicit indicator, an implicit indicator, or a combination thereof.

202. The terminal device transmits the RS in a second time unit, and the network device receives the RS in the second time unit. The second time unit is a time unit indicated by the time offset indicator n in valid uplink transmission time units starting from the first time unit.

It can be learned that the reference signal transmission method shown in FIG. 12 helps the network device flexibly determine the second time unit, the first time unit, and the time offset indicator n, thereby further increasing flexibility of selecting the first time unit.

In this way, on one hand, it helps the network device select a time unit that carries data scheduling control information as the first time unit, to merely trigger the terminal device to transmit the RS by using the data scheduling control information, thereby avoiding a resource waste caused by transmitting extra first information to specially trigger the terminal device to transmit the RS. On the other hand, it helps the network device transmit, in different first time units, first information that triggers a plurality of terminal devices to separately transmit the RS, thereby avoiding control channel congestion caused by transmitting the plurality of pieces of first information in a same first time unit.

Figure 13:
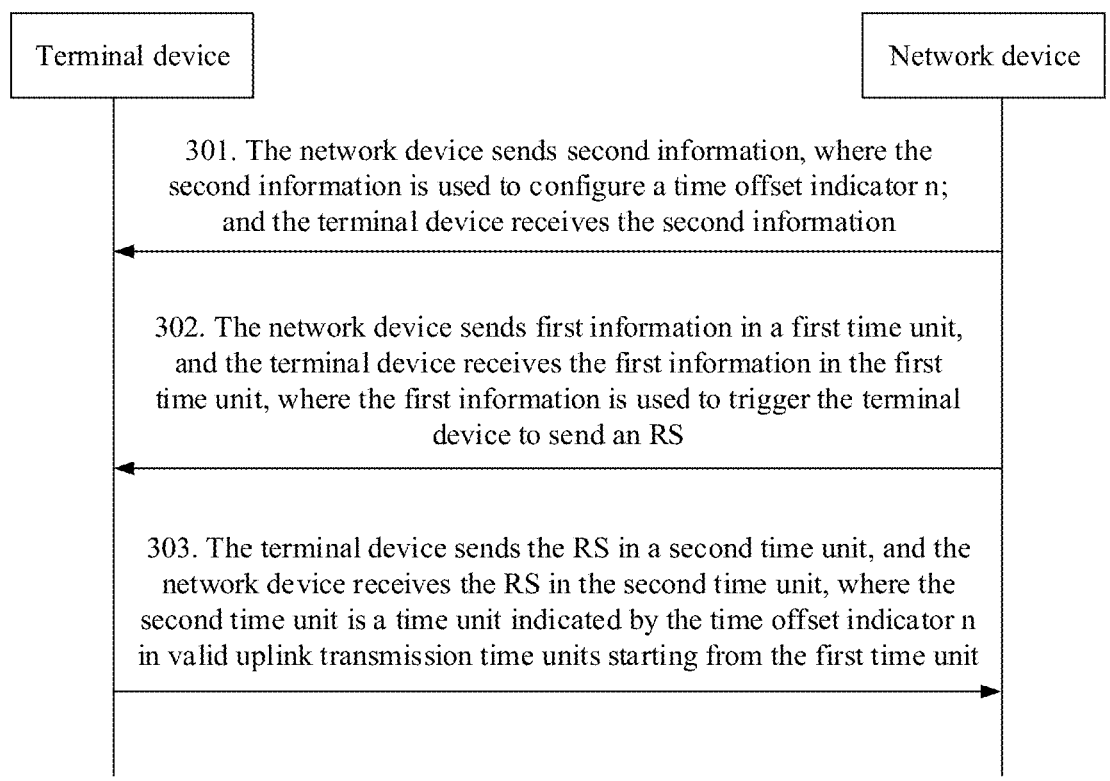
FIG. 13 is a schematic flowchart of still another reference signal transmission method according to an embodiment of this application.

FIG. 13 is a schematic flowchart of still another reference signal transmission method according to an embodiment of this application. A difference between the reference signal transmission method shown in FIG. 13 and the reference signal transmission method shown in FIG. 6 lies in that, in the reference signal transmission method shown in FIG. 13, a terminal device is notified of a time offset indicator n by using second information. The second information may be MAC CE signaling, higher layer signaling, or the like. As shown in FIG. 13, the reference signal transmission method includes the following steps.

301. A network device transmits the second information, where the second information is used to configure the time offset indicator n; and the terminal device receives the second information.

302. The network device transmits first information in a first time unit, where the first information is used to trigger the terminal device to transmit an RS; and the terminal device receives the first information in the first time unit.

303. The terminal device transmits the RS in a second time unit, and the network device receives the RS in the second time unit. The second time unit is a time unit indicated by the time offset indicator n in valid uplink transmission time units starting from the first time unit.

In the reference signal transmission method shown in FIG. 13, the time offset indicator n is configured by using the second information, so that a new field does not need to be added to the first information to carry the time offset indicator n.

As shown in FIG. 4, when a slot (namely, slot 7) used to transmit the RS and the time offset indicator n remain unchanged, in valid uplink transmission time units starting from any one of slot 0 to slot 7, the first time unit indicated by the time offset indicator n is slot 7, the second time unit indicated by the time offset indicator n is slot 8, or the third time unit indicated by the time offset indicator n is slot 9. In other words, in the reference signal transmission method shown in FIG. 13, when the time offset indicator n is configured by using the second information, flexibility of selecting the first time unit can still be ensured. This helps trigger, by using the first information for scheduling data, the terminal device to transmit the RS.

Further, as shown in FIG. 8 or FIG. 10, in valid uplink transmission slots starting from any one of slot 0 to slot 3, the first slot indicated by the time offset indicator n is slot 3, the second slot indicated by the time offset indicator n is slot 4, the third slot indicated by the time offset indicator n is slot 8, and so on. Therefore, when the terminal device is required by the network device to transmit the RS in slot 3, slot 4, slot 8, or the like, even if the time offset indicator n is configured by using the second information, any one of slot 0 to slot 3 may be used as the first time unit to transmit the first information. It can be learned that, for the schematic diagram of the slots shown in FIG. 8 or FIG. 10, the reference signal transmission method shown in FIG. 13 can also be used to improve the flexibility of selecting the first time unit, and help avoid a resource waste caused by transmitting extra first information.

For various implementations of the relationship between n and m in the reference signal transmission methods shown in FIG. 12 and FIG. 13, refer to the related content described about FIG. 7 to FIG. 11. Details are not described herein again.

In an implementation, a maximum value of the time offset indicator n is N. The maximum value N of the time offset indicator n may be predefined. Alternatively, N is configured by using higher layer signaling or media access control control element MAC CE signaling. Alternatively, N is determined based on an uplink/downlink time unit configuration.

In an implementation, a maximum value N of the time offset indicator n is determined by a total quantity of special time units and uplink time units in a TDD system frame.

To be specific, a total quantity of special time units and uplink time units in a TDD system frame is x, the time offset indicator n is an integer greater than or equal to 0, and N=x−1; or the time offset indicator n is an integer greater than zero, and N=x. For example, a schematic diagram of slots of a system frame is shown in FIG. 7, FIG. 9, or FIG. 11, and a total quantity of special slots and uplink slots is 3. Therefore, the maximum value N of n is equal to 2 (the time offset indicator n is greater than or equal to zero) or equal to 3 (the time offset indicator n is greater than zero). For another example, a schematic diagram of slots of a system frame is shown in FIG. 8 or FIG. 10, and a total quantity of special slots and uplink slots is 4. In this case, the maximum value of n is 3 (the time offset indicator n is greater than or equal to zero) or 4 (the time offset indicator n is greater than zero).

Optionally, the network device and/or the terminal device determine/determines, based on a value of N, a quantity of bits required by the time offset indicator n.

Optionally, the network device and/or the terminal device determine/determines a value range of the time offset indicator n based on the value of N.

Optionally, the network device determines the first time unit, the time offset indicator n, and the second time unit based on the value of N.

Optionally, the terminal device reads the time offset indicator n from the first information or the second information based on the value of N or the quantity of bits occupied by the time offset indicator n.

In another implementation, the value range of the time offset indicator n and/or the quantity of bits occupied by the time offset indicator n are predefined, configured by using higher layer signaling, or configured by using media access control control element MAC CE signaling.

Optionally, the network device determines the first time unit, the time offset indicator n, and the second time unit based on the value range of the time offset indicator n and/or the quantity of bits occupied by the time offset indicator n.

Optionally, the terminal device reads the time offset indicator n from the first information or the second information based on the value range of the time offset indicator n and/or the quantity of bits occupied by the time offset indicator n.

For example, if it is predefined that the quantity of bits occupied by the time offset indicator n is 2, and the time offset indicator n is greater than or equal to 0, the value range of the time offset indicator n is {0, 1, 2, 3}. The terminal device receives the first information in the first time unit, and may read the time offset indicator n, namely, 2, from the first information based on the quantity of bits occupied by the time offset indicator n. The terminal device determines m based on the time offset indicator, 2, and the relationship between n and m in the foregoing implementations. The terminal device may transmit the RS in an $m^{th}$ time unit in the valid uplink transmission time units starting from the first time unit.

In still another implementation, m is an order of the second time unit in the valid uplink transmission time units starting from the first time unit. The value range of m may be predefined, configured by using higher layer signaling or MAC CE signaling, or determined based on an uplink/downlink time unit configuration. For example, the value range of m is a set M, the set M is $\{m_0, m_1, m_2, \ldots, m_{Y-1}\}$, and Y is greater than zero. In this case, the time offset indicator n requires a maximum of $\lceil \log_2^Y \rceil$ bits, to completely indicate all possible values of m.

Optionally, a correspondence between values in the set M and values of the time offset indicator n may be obtained based on a one-to-one correspondence of orders of index numbers.

By way of example and not limitation, Y is equal to 4, and n is two bits. In this case, the correspondence between the values in the set M and the values of the time offset indicator n may be obtained based on the one-to-one correspondence of the orders of the index numbers, as shown in Table 1.

TABLE 1

Correspondence between the values in the set M and the values of the time offset indicator n

| Values in the set M | Time offset indicator n |
|---|---|
| $m_0$ | 00 |
| $m_1$ | 01 |
| $m_2$ | 10 |
| $m_3$ | 11 |

Optionally, the network device determines the first time unit, the time offset indicator n, and the second time unit based on the value range of m and the correspondence between m and n.

Optionally, the terminal device determines the second time unit based on the value range of m, the correspondence between m and n, the first time unit, and the time offset indicator n in the first information or the second information.

For example, that the terminal device determines the second time unit based on the first time unit and the time offset indicator n includes: The terminal device determines, based on the value range of m, the quantity of bits occupied by the time offset indicator n. The terminal device reads the time offset indicator n and m corresponding to the time offset indicator n from the first information based on the quantity of bits occupied by the time offset indicator n. The terminal device determines the second time unit based on m and the first time unit.

The valid uplink transmission time unit is determined based on an uplink/downlink time unit configuration. The valid uplink transmission time units are time units, starting from the first time unit, available for uplink transmission, in a time unit configuration determined based on an uplink/downlink time unit configuration.

In an implementation, the valid uplink transmission time units are special time units and uplink time units, or the valid uplink transmission time units are special time units and uplink time units starting from the first time unit. The special time units include time domain resources used for uplink transmission.

For example, the time unit is a slot. Valid uplink transmission slots are special slots and uplink slots. Therefore, in this implementation, valid uplink transmission slots in FIG. 4 are a slot marked S and slots marked U, namely, slot 7, slot 8, and slot 9.

In another implementation, the valid uplink transmission time units are special time units, or special time units starting from the first time unit. The special time units include time domain resources used for uplink transmission. For example, the time unit is a slot. Valid uplink transmission slots are special slots. For example, a valid uplink transmission slot in FIG. 4, FIG. 7, FIG. 9, or FIG. 11 is a slot marked S, for example, slot 7. For example, valid uplink transmission slots in FIG. 8 or FIG. 10 are slots marked S, for example, slot 3 and slot 8.

In still another implementation, the valid uplink transmission time units are uplink time units. For example, the time unit is a slot. Valid uplink transmission slots are uplink slots. Therefore, in this implementation, valid uplink transmission slots in FIG. 4, FIG. 7, FIG. 9, or FIG. 11 are slots marked U, namely, slot 8 and slot 9. Valid uplink transmission slots in FIG. 8 or FIG. 10 are slots marked U, namely, slot 4 and slot 9.

In still another implementation, the valid uplink transmission time unit is a time unit satisfying the following features: a time domain resource offset between time domain resources occupied by the RS in the time unit and time domain resources occupied by the first information is greater than or equal to a processing delay of the RS, and the time domain resources occupied by the RS in the time unit are determined based on configuration information.

In other words, the valid uplink transmission time units starting from the first time unit are time units, starting from the first time unit, available for uplink transmission, and satisfying the features. A time unit available for uplink transmission is a time unit including time domain resources used for uplink transmission, for example, a special time unit or an uplink time unit.

The processing delay of the RS includes at least a detection delay of the first information and a preparation delay of the RS. The processing delay of the RS is, for example, but not limited to, a minimum time interval between the last symbol in the time domain resources occupied by the first information that triggers the RS and the first symbol in the time domain resources occupied by the RS.

In an implementation, the first information is included in, for example, but not limited to, DCI, downlink control signaling, or MAC-CE signaling. In this implementation, the time domain resources occupied by the first information that triggers the RS are time domain resources occupied by the DCI or the signaling that includes the first information, or time domain resources occupied by the DCI or the signaling in which the first information is located.

In another implementation, the first information is, for example, but not limited to, DCI, downlink control signaling, or MAC-CE signaling, and the first information carries a trigger indication. In this implementation, the time domain resources occupied by the first information that triggers the RS are time domain resources occupied by the DCI or the foregoing signaling.

Optionally, if the minimum time interval is in a unit of a symbol, the minimum time interval is a quantity of symbols between the last symbol in the time domain resources occupied by the first information that triggers the RS and the first symbol in the time domain resources occupied by the RS, and is determined with reference to a minimum subcarrier spacing. The minimum subcarrier spacing is a smaller subcarrier spacing between a subcarrier spacing of the first information and a subcarrier spacing of the RS.

In a possible implementation, the terminal device determines, based on the foregoing features, the valid uplink transmission time units starting from the first time unit; and the terminal device determines, in the valid uplink transmission time units, the second time unit indicated by the time offset indicator n.

Figure 14:
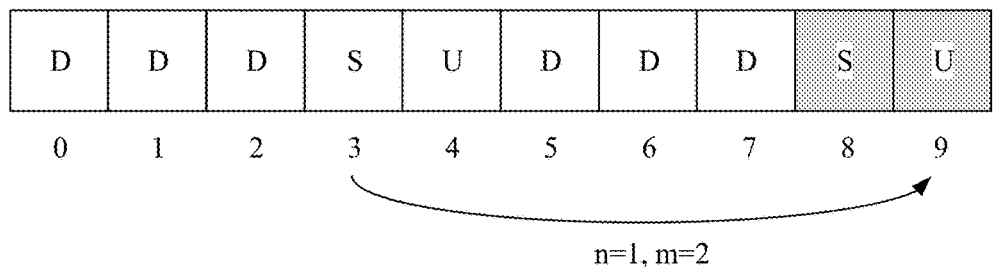
FIG. 14 is still another schematic diagram of a reference signal transmission method according to an embodiment of this application.

For example, FIG. 14 is used as an example. It is assumed that the RS is an SRS, and an SRS resource set (which may also be referred to as SRS configuration information) is configured for the terminal device by using higher layer signaling. Specific time domain resources in a time unit that are available for transmitting the SRS are specified in the SRS resource set. It is assumed that, as configured in the SRS resource set, the time domain resources occupied by the SRS are the last seven symbols in a slot, the time domain resources occupied by the first information are the first two symbols in a slot, one slot includes 14 symbols, a processing delay of the SRS is 28 symbols, and m is equal to the value of n plus 1.

It is assumed that the terminal device receives the first information in slot 3, where the first information is used to trigger the terminal device to transmit the SRS. When determining valid uplink transmission slots starting from slot 3, the terminal device needs to consider the foregoing features. Because the processing delay of the SRS is 28 symbols, the valid uplink transmission slots need to be at least one slot away from slot 3, to satisfying a feature that a time domain resource offset between the time domain resources occupied by the first information and the time domain resources occupied by the SRS is greater than or equal to the processing delay of the SRS.

Therefore, in FIG. 14, a time domain resource offset between slot 4 and slot 3 cannot satisfy this feature, and slot 4 does not belong to the valid uplink transmission slots starting from slot 3. A time domain resource offset between slot 3 and each of slot 8, slot 9, and a slot that is in a next system frame and that is available for uplink transmission can satisfy this feature. Therefore, the valid uplink transmission slots starting from slot 3 are slot 8, slot 9, and the slot that is in the next system frame and that is available for uplink transmission. Therefore, the terminal device may determine the second slot, namely, slot 9, in the valid uplink transmission slots starting from slot 3, based on the time offset indicator n, namely, 1, in the first information or the second information. Therefore, the terminal device may transmit the SRS in slot 9.

In still another implementation, the valid uplink transmission time unit is a time unit satisfying the following features: a quantity of time domain resources in the time unit that are allowed for transmitting the RS is greater than or equal to a quantity of the time domain resources occupied by the RS, and the quantity of the time domain resources occupied by the RS is determined based on configuration information.

The configuration information may be used to configure an RS pattern. The RS pattern is used to determine time-frequency resources occupied by the RS. A 1 transmit-4 receive (1T4R) structure is used as an example. The terminal device has four antennas. The configuration information may be used to configure four resources, to separately measure a channel between each antenna and the network device. There is a resource interval of Y symbols between every two resources. Y is an integer greater than or equal to 1. In this case, the time domain resources occupied by the RS are all time domain resources starting from the first resource to the end of the fourth resource and includes the resource interval. For example, assuming that each resource is one symbol, and Y is equal to 1, the terminal device may determine, based on the configuration information, that a quantity of time domain resources occupied by the RS is seven.

In other words, the valid uplink transmission time units starting from the first time unit are time units, starting from the first time unit, available for uplink transmission, and satisfying the features. A time unit available for uplink transmission is a time unit including an uplink transmission resource, for example, a special time unit or an uplink time unit.

Figure 15:
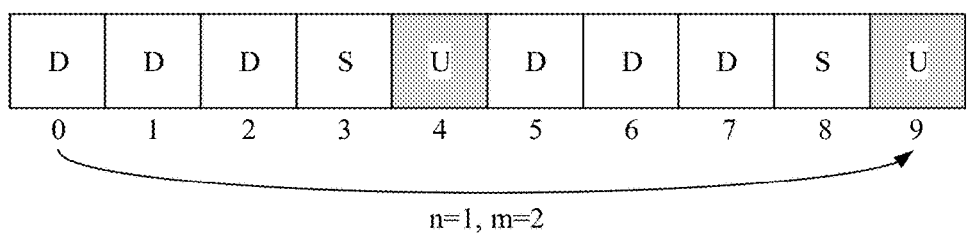
FIG. 15 is still another schematic diagram of a reference signal transmission method according to an embodiment of this application.

For example, FIG. 15 is used as an example. It is assumed that, the RS is an SRS; as configured in an SRS resource set, time domain resources occupied by the SRS are seven symbols; m is equal to the value of n plus 1; time domain resources in a special slot that are allowed for transmitting the SRS are six symbols; and time domain resources in an uplink slot that are allowed for transmitting the SRS are more than seven symbols.

In this way, after receiving the first information in slot 0, the terminal device determines that valid uplink transmission slots starting from slot 0 and satisfying the foregoing features are slot 4 and slot 9. The terminal device determines, based on the time offset indicator n=1 configured in the first information or the second information, that an $m^{th}$ slot, namely, the second slot, in the valid uplink transmission slots satisfying the foregoing features is slot 9.

Optionally, the valid uplink transmission time units may be determined based on one or more features in the foregoing implementations. In other words, the valid uplink transmission time units starting from the first time unit are time units, starting from the first time unit, available for uplink transmission, and satisfying one or more of the foregoing features.

For example, features that the valid uplink transmission time unit needs to satisfy is as follows: (1) The time unit is a special time unit and an uplink time unit. (2) A time domain resource offset between time domain resources occupied by the RS in the time unit and time domain resources occupied by the first information is greater than or equal to a processing delay of the RS, and the time domain resources occupied by the RS in the time unit are determined based on configuration information. (3) A quantity of time domain resources in the time unit that are allowed for transmitting the RS is greater than or equal to a quantity of the time domain resources occupied by the RS, and the quantity of the time domain resources occupied by the RS is determined based on the configuration information.

Figure 16:
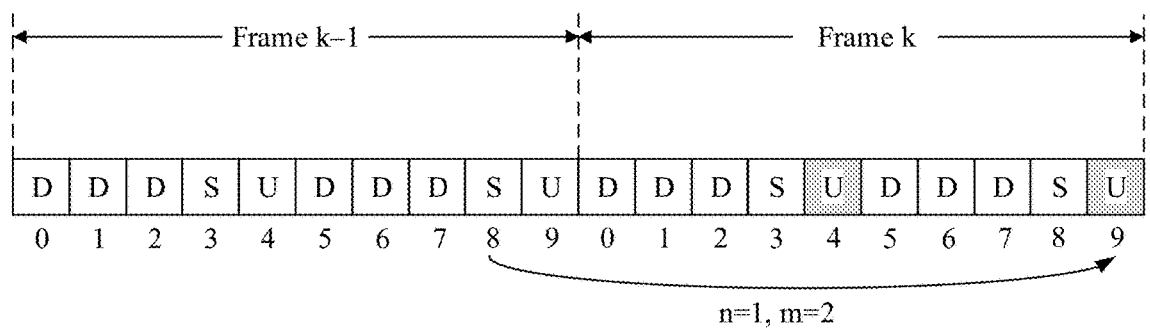
FIG. 16 is still another schematic diagram of a reference signal transmission method according to an embodiment of this application.

FIG. 16 is used as an example. It is assumed that, as configured in the SRS resource set, the time domain resources occupied by the SRS are the last seven symbols in a slot, the time domain resources occupied by the first information are the first two symbols in a slot, one slot includes 14 symbols, a processing delay of the SRS is 28 symbols, m is equal to the value of n plus 1, and time domain resources in a special slot that are allowed for transmitting the SRS are fewer than seven symbols.

As shown in FIG. 16, the terminal device receives the first information in slot 8 in frame k−1, where the first information is used to trigger the terminal device to transmit the SRS. The terminal device needs to determine, based on the foregoing three features (1), (2), and (3), valid uplink transmission slots starting from slot 8 in frame k−1.

In the slots starting from slot 8 in frame k−1 and available for uplink transmission, slots satisfying feature (1) are slot 8 and slot 9 in frame k−1, slot 3, slot 4, slot 8, and slot 9 in frame k, and special slots, uplink slots, and the like in subsequent frames.

Because a quantity of time domain resources in a special slot that are used for transmitting the SRS is less than a quantity of time domain resources occupied by the SRS, in the slots starting from slot 8 in frame k−1 and available for uplink transmission, slots satisfying feature (1) and feature (3) are slot 9 in frame k−1, slot 4 and slot 9 in frame k, uplink slots and the like in subsequent frames.

Because the processing delay of the SRS is 28 symbols, the valid uplink transmission slots need to be at least one slot away from slot 8 in frame k−1, and in the slots starting from slot 8 in frame k−1 and available for uplink transmission, slots satisfying features (1), (2), and (3) are slot 4 and slot 9 in frame k, and uplink slots and the like in subsequent frames.

In this way, the terminal device determines that the second slot in the valid uplink transmission slots starting from slot 8 in frame k−1 is slot 9 in frame k−1 based on the time offset indicator n, namely, 1, included in the first information or configured in the second information.

Optionally, when the valid uplink transmission time units are determined, if feature (2) above is not necessary to be satisfied, a quantity of time domain resources in the second time unit that are used for transmitting the RS may be less than the quantity of time domain resources occupied by the RS. In this case, the terminal device may use, in the second time unit based on the configuration information, time domain resources allowed for transmitting the RS to transmit some RSs.

In still another implementation, when the second time unit is determined based on the first time unit, conversion needs to be performed based on a subcarrier spacing of the first information and a subcarrier spacing of the RS. The subcarrier spacing of the first information is a subcarrier spacing used to transmit the first information. The subcarrier spacing of the RS is a subcarrier spacing used to transmit the RS.

When the subcarrier spacing of the first information and the subcarrier spacing of the RS are the same, an index number of the first time unit on a subcarrier of the first information is the same as an index number of the first time unit on a subcarrier of the RS. The terminal device determines that a time unit indicated by the time offset indicator n in the valid uplink transmission time units starting from the first time unit is the second time unit, as shown in the foregoing implementations.

When the subcarrier spacing of the first information and the subcarrier spacing of the RS are different, the terminal device further needs to convert the first time unit into a third time unit based on the subcarrier spacing of the RS, and then determine a time unit indicated by the time offset indicator n in valid uplink transmission time units starting from the third time unit.

For example, if the subcarrier spacing of the first information and the subcarrier spacing of the RS are different, "the second time unit is a time unit indicated by the time offset indicator n in valid uplink transmission time units starting from the first time unit" may be understood as follows: The terminal device converts the first time unit into a third time unit on the subcarrier of the RS based on the subcarrier spacing of the RS. The terminal device determines to use an $m^{th}$ time unit in the valid uplink transmission time units starting from the third time unit as the second time unit. m is an integer determined based on the value of n.

In other words, when the subcarrier spacing of the first information and the subcarrier spacing of the RS are different, an index of the second time unit is an index indicated by the time offset indicator n in indexes that start from a first index and that correspond to the valid uplink transmission time units. The first index is an index of the third time unit. The index of the third time unit is an index corresponding to a time unit to which the first time unit is converted on the subcarrier of the RS.

It is assumed that the subcarrier spacing of the first information and the subcarrier spacing of the RS are different, and the first time unit is slot 1 in frame k on the subcarrier of the first information; and after conversion is performed based on the subcarrier spacing of the RS, a time domain resource occupied by the first information is located on the subcarrier of the RS, namely, slot 2 in frame k. In this case, the terminal device may determine a slot indicated by the time offset indicator n in valid uplink transmission slots starting from slot 2 as a slot for transmitting the RS.

To be specific, in the schematic diagrams of slots shown in the foregoing figures, an example in which the subcarrier spacing of the first information and the subcarrier spacing of the RS are the same is used for description. If the subcarrier spacing of the first information and the subcarrier spacing of the RS are different, the schematic diagrams of the slots in the foregoing figures are schematic diagrams of slots on the subcarrier of the RS. In this case, the first time unit in the related descriptions of the figures is actually the third time unit on the subcarrier of the RS.

The foregoing content describes the transmission method of a reference signal for measuring an uplink channel. Embodiments of this application further provide a transmission method of a reference signal for measuring a downlink channel.

Figure 17:
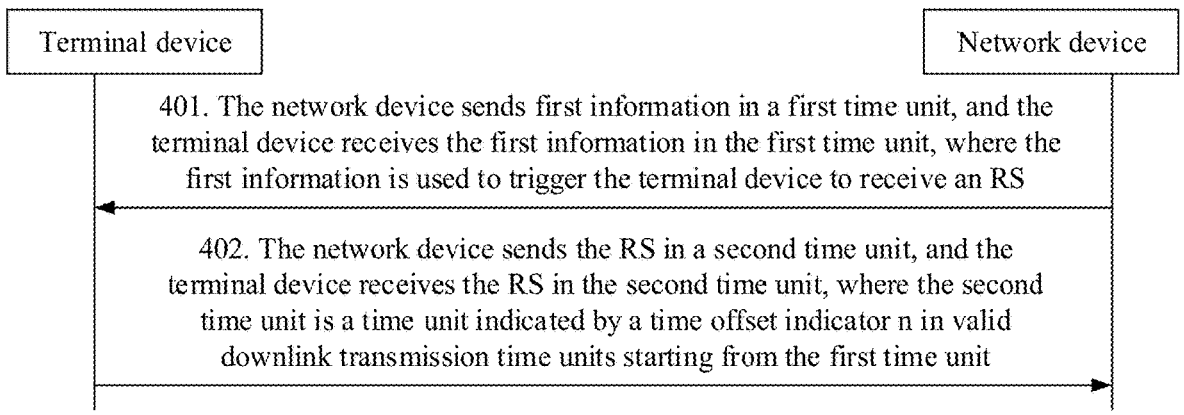
FIG. 17 is a schematic flowchart of still another reference signal transmission method according to an embodiment of this application.

FIG. 17 is a schematic flowchart of still another reference signal transmission method according to an embodiment of this application. As shown in FIG. 17, the reference signal transmission method includes the following steps.

401. A network device transmits first information in a first time unit, where the first information is used to indicate a terminal device to receive a reference signal RS; and the terminal device receives the first information in the first time unit.

402. The network device transmits the RS in a second time unit; and the terminal device receives the RS in the second time unit. The second time unit is a time unit indicated by a time offset indicator n in valid downlink transmission time units starting from the first time unit.

It can be learned that the time offset indicator n indicates a time unit in the valid downlink transmission time units. Bit overheads of the time offset indicator n are less than those required in a manner in which the time offset indicator n indicates a time offset between the first time unit and the second time unit.

Figure 18:
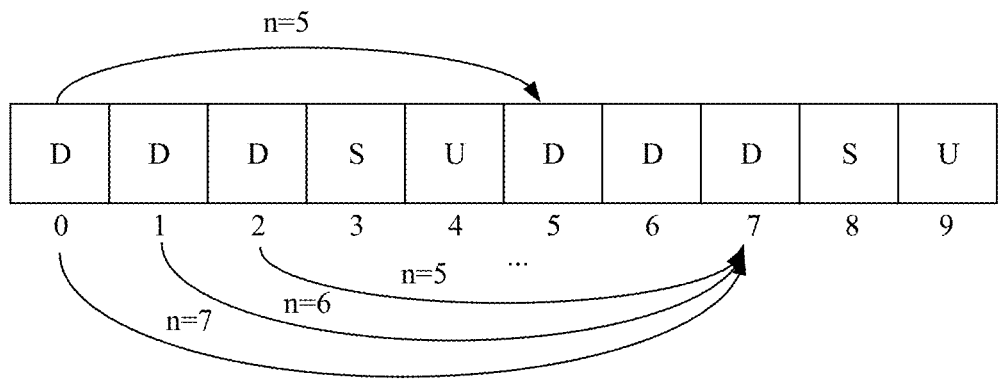
FIG. 18 is still another schematic diagram of a reference signal transmission method according to an embodiment of this application.

For the manner in which the time offset indicator n indicates the time offset between the first time unit and the second time unit, the time offset indicator n is used to indicate the time offset, and a large quantity of bits is required. As shown in FIG. 18, if the network device determines that the first time unit is slot 0 and the second time unit is slot 5, a time offset between slot 0 and slot 5 is 5. Therefore, three bits are required by the time offset indicator n to indicate slot 5 to the terminal device.

Figure 19:
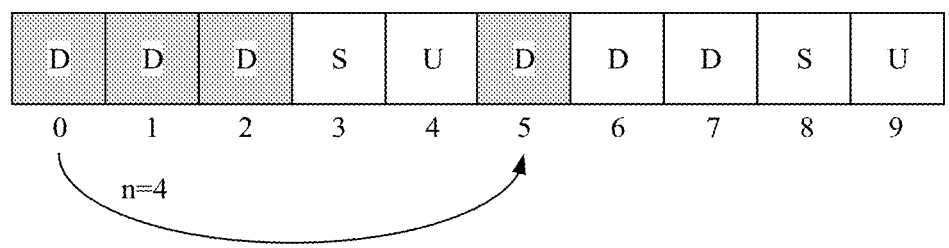
FIG. 19 is still another schematic diagram of a reference signal transmission method according to an embodiment of this application.

However, in this implementation of embodiments of this application, the time offset indicator n is used to indicate a time unit in the valid downlink transmission time units starting from the first time unit. As shown in FIG. 19, if the network device determines that the first time unit is slot 0 and the second time unit is slot 5, valid downlink transmission slots starting from slot 0 are slot 0, slot 1, slot 2, and slot 5. Slot 5 is the fourth slot in the valid downlink transmission slots. Therefore, two bits are required by the time offset indicator n (that is, the time offset indicator n is equal to 11, and m is equal to n+1) to indicate slot 5. It can be learned that, bit overheads of the time offset indicator n in the implementation of FIG. 19 are lower than those required in FIG. 18.

In an implementation, that the second time unit is a time unit indicated by the time offset indicator n in the valid downlink transmission time units starting from the first time unit may mean: The second time unit is an $m^{th}$ time unit in the valid downlink transmission time units starting from the first time unit. m is equal to a value of n, or a value of n plus 1, or m is a value determined based on n and a value range of m.

In still another implementation, the second time unit is an $m^{th}$ time unit in the valid downlink transmission time units starting from the first time unit. When the first time unit is a special time unit, m is equal to the value of n plus 1, that is, m=n+1. When the first time unit is a downlink time unit, m is equal to the value of n, that is, m=n, and n is not equal to 0.

For the foregoing implementations of the relationship between m and n, refer to the related descriptions in the foregoing embodiments. Details are not described herein again.

In an implementation, the first information is used to indicate the time offset indicator n. By way of example and without limitation, the first information includes the time offset indicator n.

In another implementation, the network device further transmits second information, where the second information is used to configure the time offset indicator n. The network device may determine the first time unit based on the time offset indicator n and the second time unit.

In an implementation, a maximum value of the time offset indicator n is predefined, the maximum value of the time offset indicator n is configured by using higher layer signaling or media access control control element MAC CE signaling, or the maximum value of the time offset indicator n is determined based on an uplink/downlink time unit configuration.

In another implementation, a value range of the time offset indicator n and a quantity of bits occupied by the time offset indicator n are predefined, configured by using higher layer signaling, or configured by using media access control control element MAC CE signaling.

In still another implementation, the valid downlink transmission time units are time units satisfying one or more of the following features, or the valid downlink transmission time units starting from the first time unit are time units starting from the first time unit, available for downlink transmission, and satisfying one or more of the following features:

the time unit is a special time unit and/or a downlink time unit;

a time domain resource offset between time domain resources occupied by the RS in the time unit and time domain resources occupied by the first information is greater than or equal to a processing delay of the RS, and the time domain resources occupied by the RS in the time unit are determined based on configuration information; or a quantity of time domain resources in the time unit that are allowed for transmitting the RS is greater than or equal to a quantity of the time domain resources occupied by the RS, and the quantity of the time domain resources occupied by the RS is determined based on the configuration information.

It can be learned that, based on the features of the valid downlink transmission time units, the quantity of valid downlink transmission time units starting from the first time unit is small, so that the quantity of bits required by the time offset indicator n can be further reduced.

In embodiments of this application, the special time unit may be a time unit including flexible transmission time domain resources. RRC signaling may be used to indicate that the flexible transmission time domain resource is an uplink transmission time domain resource or a downlink transmission time domain resource. Alternatively, according to a service requirement, it is dynamically indicated that the flexible transmission time domain resource is an uplink transmission time domain resource or a downlink transmission time domain resource. For example, DCI signaling is used to indicate that the flexible transmission time domain resource is an uplink transmission time domain resource or a downlink transmission time domain resource.

Figure 22:
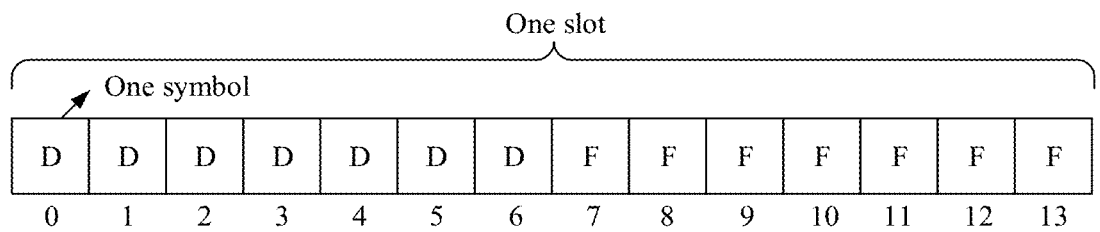
FIG. 22 is a schematic diagram of a structure of a special time unit according to an embodiment of this application.

For example, the special time unit is a slot, and the flexible transmission time domain resource is a symbol. As shown in FIG. 22, one slot includes 14 symbols. Symbol 0 to symbol 6 are downlink transmission symbols, symbol 7 to symbol 12 are flexible transmission symbols, and symbol 13 is an uplink transmission symbol. Symbol 7 to symbol 12 may be used as symbols used for uplink transmission or symbols used for downlink transmission based on an RRC signaling indication or a DCI signaling indication.

It may be understood that, in embodiments of this application, a flexible transmission symbol may also be referred to as a flexible symbol. It may be further understood that, in embodiments of this application, a "flexible transmission time domain resource" may be replaced with a "flexible symbol".

It may be understood that a flexible transmission time domain resource in a special time unit may be used as a guard interval, so that interference caused by uplink-downlink transmission switching is avoided by using a reserved guard interval.

In embodiments of this application, a valid uplink transmission time unit is a time unit satisfying one or more of the features described in the foregoing embodiments and features described in Implementation 1 and Implementation 2 below. For example, a time unit satisfying the feature that a time domain resource offset between the time domain resources occupied by the RS and the time domain resources occupied by the first information is greater than or equal to the processing delay of the RS and satisfying Implementation 1 is a valid uplink transmission time unit. For another example, a time unit satisfying the feature that the quantity of time domain resources allowed for transmitting the RS is greater than or equal to the quantity of time domain resources occupied by the RS and satisfying Implementation 2 is a valid uplink transmission time unit. For another example, a time unit satisfying the feature that the quantity of time domain resources allowed for transmitting the RS is greater than or equal to the quantity of time domain resources occupied by the RS and satisfying Implementation 1 and Implementation 2 is a valid uplink transmission time unit. For another example, a time unit satisfying the feature that the quantity of time domain resources allowed for transmitting the RS is greater than or equal to the quantity of time domain resources occupied by the RS, satisfying the feature that a time domain resource offset between the time domain resources occupied by the RS in the time unit and the time domain resources occupied by the first information is greater than or equal to the processing delay of the RS, and satisfying Implementation 1 and Implementation 2 is a valid uplink transmission time unit. For still another example, a special time unit satisfying Implementation 1 is a valid uplink transmission time unit. For still another example, a special time unit satisfying Implementation 2 is a valid uplink transmission time unit. A combination manner of the features to be satisfied is not limited in this embodiment of this application.

The following describes the features described in Implementation 1 and Implementation 2.

Implementation 1: K time domain resources before the first time domain resource occupied by the RS in a special time unit do not include a downlink transmission time domain resource, and K is greater than or equal to zero.

In other words, in this embodiment of this application, whether a special time unit is a valid uplink transmission time unit may be determined based on uplink/downlink features of K time domain resources before the first time domain resource occupied by the RS.

The first time domain resource occupied by the RS may also be referred to as a start time domain resource or a start location of the RS, and is for example, the first symbol, a start symbol, or a start symbol location occupied by the RS.

Specifically, if the K time domain resources before the first time domain resource of the RS in the special time unit do not include a downlink transmission time domain resource, the special time unit is a valid uplink transmission time unit. If the K time domain resources before the first time domain resource of the RS in the special time unit include at least one downlink transmission time domain resource, the special time unit is not a valid uplink transmission time unit. The special time unit is referred to as an invalid uplink transmission time unit or an unavailable uplink transmission time unit.

In other words, Implementation 1: An offset between the last downlink transmission time domain resource before the first time domain resource occupied by the RS in the special time unit and the first time domain resource occupied by the RS is greater than K.

Specifically, if the offset between the last downlink transmission time domain resource before the first time domain resource occupied by the RS in the special time unit and the first time domain resource occupied by the RS is greater than K, the special time unit is a valid uplink transmission time unit. If the offset between the last downlink transmission time domain resource before the first time domain resource occupied by the RS in the special time unit and the first time domain resource occupied by the RS is less than or equal to K, the special time unit is not a valid uplink transmission time unit.

K may be predefined in a protocol. By way of example and not limitation, when a subcarrier spacing is 1.25 kHz or 5 kHz, K=0; when a subcarrier spacing is 15 kHz, 30 kHz, 60 kHz, or 120 kHz, K=2. By way of example and not limitation, when a subcarrier spacing is 1.25 kHz or 5 kHz, K=2; when a subcarrier spacing is 15 kHz, 30 kHz, 60 kHz, or 120 kHz, K=4. Alternatively, K may be configured by the network device. By way of example and not limitation, the network device configures K to 2 or the network device configures K to 4.

Optionally, when K is equal to 0, because the subcarrier spacing is small, cyclic prefix duration included in each time domain resource is long. Therefore, no time domain resource may be reserved between the first time domain resource occupied by the RS and the last downlink transmission time domain resource before the first time domain resource, so that interference caused by uplink-downlink switching can be avoided.

In a possible implementation, K is greater than or equal to 0. In another possible implementation, K is greater than 0. K may be reported by the terminal with a capability, configured by the network device, or predefined in a protocol.

For example, a time domain resource is a symbol and a time unit is a slot. A slot shown in FIG. 22 is used as an example. Assuming that a start symbol of an RS is symbol 7 and K is equal to 2, two symbols before symbol 7 are symbol 5 and symbol 6. Because both symbol 5 and symbol 6 are downlink transmission symbols, the slot is an invalid uplink transmission slot. Assuming that a start symbol of an RS is symbol 9 and K is equal to 2, two symbols before symbol 9 are symbol 7 and symbol 8. Because neither symbol 7 nor symbol 8 is a downlink transmission symbol, the slot is a valid uplink transmission slot.

For another example, in other words, the slot shown in FIG. 22 is used as an example. Assuming that a start symbol of an RS is symbol 7 in FIG. 22 and K is equal to 2, the last downlink transmission symbol before symbol 7 is symbol 6. Because an offset between symbol 6 and symbol 7 is 1 which is less than K, the slot is an invalid uplink transmission slot. Assuming that a start symbol of an RS is symbol 9 in FIG. 22 and K is equal to 2, the last downlink transmission symbol before symbol 9 is symbol 6. Because an offset between symbol 6 and symbol 9 is 3 which is greater than K, the slot is a valid uplink transmission slot.

It can be learned that, in this implementation, whether a special time unit is a valid uplink transmission time unit is determined based on an offset between the first time domain resource of an RS in a time unit and a previous downlink transmission time domain resource, or based on uplink/downlink features of K time domain resources before the first time domain resource of the RS. This helps reserve time for uplink-downlink switching, and avoid an interference problem caused during the uplink-downlink switching.

Implementation 2: Time domain resources occupied by the RS in the special time unit are located between a time domain resource L+1 to a time domain resource L+N, N is greater than or equal to 0, a time domain resource L is the last time domain resource in a control resource set CORE-SET in which third information is located, and the third information is used to indicate a time unit format.

In other words, if the time domain resources occupied by the RS in the special time unit are located between the time domain resource L+1 and the time domain resource L+N (the time domain resources occupied by the RS may fall within the time domain resource L+1 to the time domain resource L+N, or the time domain resources occupied by the RS may be the time domain resource L+1 to the time domain resource L+N), the special time unit is a valid uplink transmission time unit. Otherwise, the special time unit is an invalid (or unavailable) uplink transmission time unit.

The third information may be slot format indicator (SFI) DCI. A DCI format of the SFI DCI may be, for example, but not limited to, DCI format 2_0. The SFI DCI may be DCI scrambled by using a slot format indicator-radio network temporary identifier (SFI-RNTI). Optionally, a slot format of a normal cyclic prefix may be shown in Table 2.

For example, it is assumed that a time domain resource is a symbol. Symbols occupied by an RS are symbol 8 and symbol 9 shown in FIG. 22 (that is, a start symbol of the RS is symbol 8, and an end symbol of the RS is symbol 9), the last symbol of a CORESET in which the SFI DCI is located is symbol 6, and N is equal to 4. In this case, symbol 8 and symbol 9 occupied by the RS are located between symbol 10 and the last symbol, symbol 6, of the CORESET in which the SFI DCI is located. In this case, a flexible slot shown in FIG. 22 is a valid uplink transmission time unit.

N may be reported by the terminal with a capability, configured by the network device, or predefined in a protocol. By way of example and not limitation, N is equal to $N_2$. $N_2$ is PUSCH preparation time of a terminal device with a physical uplink shared channel (PUSCH) timing capability 1 shown in Table 3, or PUSCH preparation time of the terminal device with a PUSCH timing capability 2 shown in Table 4. $\mu$ is an identifier of a system parameter. A value of $\mu$ is related to a subcarrier spacing, as shown in Table 5 below. U represents an uplink symbol, D represents a downlink symbol, and F represents a flexible symbol. A slot format may include a downlink symbol, an uplink symbol, and a flexible symbol.

It should be understood that the time unit format refers to location information of a downlink symbol, an uplink symbol, and a flexible symbol in a time unit. For example, one slot includes 14 symbols. The first 10 symbols are downlink symbols, the last two symbols are uplink symbols, and the remaining two symbols in the middle are flexible symbols. For details, refer to Table 2 in the specification.

It can be learned that, in Implementation 2, whether a special time unit is a valid uplink transmission time unit may be considered based on a relationship between a processing delay (for example, PUSCH preparation time) of the terminal device and time domain resources occupied by an RS, so that the RS can be sent as much as possible, and a problem of resource waste caused by transmitting the RS is avoided. In addition, it helps resolve an ambiguity problem that the terminal device and the network device cannot learn whether the special time unit is used for uplink transmission or downlink transmission.

TABLE 2

Slot format in a normal cyclic prefix

| For-mat | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | F | F | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | U | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |

TABLE 2-continued

Slot format in a normal cyclic prefix

| For-mat | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | D | F | U | U | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | D | D | D | D | D | D | D | D | D |
| 55 | D | D | F | F | U | U | U | D | D | D | D | D | D | D |
| 56 to 254 | Reserved bit | | | | | | | | | | | | | |
| 255 | The terminal determines the slot format based on a time division duplex-uplink-downlink common configuration, a time division duplex-uplink-downlink-dedicated configuration, or a detected DCI format (UE determines the slot format for the slot based on tdd-UL-DL-ConfigurationCommon, or tdd-UL-DL-ConfigurationDedicated and, if any, on detected DCI formats). | | | | | | | | | | | | | |

TABLE 3

PUSCH preparation time of a terminal device with a PUSCH timing capability 1 (PUSCH preparation time N2)

| μ | PUSCH preparation time $N_2$ [symbols] |
|---|---|
| 0 | 10 |
| 1 | 12 |
| 2 | 23 |
| 3 | 36 |

TABLE 4

PUSCH preparation time of a terminal device with a PUSCH timing capability 2

| μ | PUSCH preparation time $N_2$ [symbols] |
|---|---|
| 0 | 5 |
| 1 | 5.5 |
| 2 | 11 for frequency range 1 |

TABLE 5

Relationship between μ and the subcarrier spacing

| μ | Subcarrier spacing ($\Delta f = 2^\mu \cdot 15$ [kHz]) | Cyclic prefix |
|---|---|---|
| 0 | 15 | Normal |
| 1 | 30 | Normal |
| 2 | 60 | Normal Extended |
| 3 | 120 | Normal |
| 4 | 240 | Normal |

In addition, for the foregoing features that the foregoing valid uplink transmission time units need to satisfy, whether a time unit is a valid uplink transmission time unit may be determined with reference to one or more features. That is, the foregoing features may be applied to determining the valid uplink transmission time units starting from the first time unit and further determining the second time unit with reference to the time offset indicator n. For example, a special time unit satisfying Implementation 1 is a valid uplink transmission time unit, a special time unit satisfying Implementation 2 is a valid uplink transmission time unit, or a special time unit satisfying Implementation 1 and Implementation 2 is a valid uplink transmission time unit.

In this embodiment of this application, after the terminal device receives the first information in the first time unit and before the terminal device transmits the RS in the second time unit, the reference signal transmission method further includes: The terminal device receives third information. The third information is used to indicate the time unit format. The time unit format becomes valid after the second time unit, or the time unit format becomes valid after the last time domain resource occupied by the RS in the second time unit. Optionally, the third information may be slot format indicator (SFI) DCI. Optionally, in this case, the second time unit is a special time unit.

The third information is used to indicate to modify a flexible time domain resource in a special time unit to a downlink transmission time domain resource or modify a flexible time domain resource in a special time unit to an uplink transmission time domain resource. When the third information is used to indicate to modify a flexible time domain resource in a special time unit to a downlink transmission time domain resource, that the time unit format becomes valid after the second time unit may be: modifying a special time unit after the second time unit to a downlink transmission time unit, or modifying a flexible time domain resource in a special time unit after the second time unit to a downlink transmission time domain resource. Alternatively, when the third information is used to indicate to modify a flexible time domain resource in a special time unit to a downlink transmission time domain resource, that the time unit format becomes valid after the last time domain resource occupied by the RS in the second time unit may be: modifying a flexible time domain resource after the last time domain resource occupied by the RS in the second time unit to a downlink transmission time domain resource, and modifying a special time unit after the second time unit to a downlink transmission time unit.

Figure 23:
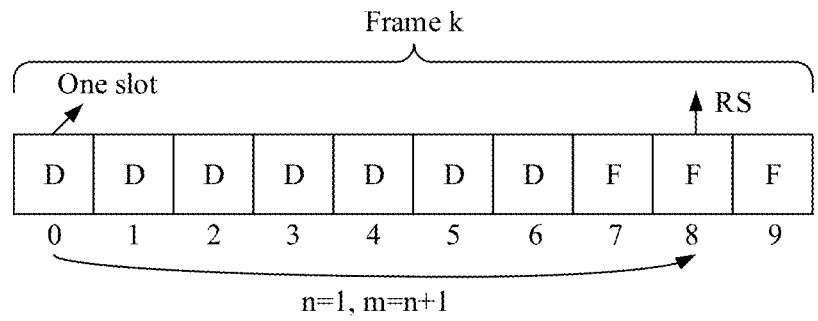
FIG. 23 is a schematic diagram of a structure of frame k according to an embodiment of this application.

For example, frame k shown in FIG. 23 includes 10 slots. Slot 0 to slot 6 are downlink transmission slots, and slot 7 to slot 9 are special slots. In addition, it is assumed that symbols in slot 7 to slot 9 are shown in FIG. 22, the first symbol occupied by an RS is symbol 9, and K is equal to 2. Based on the method in Implementation 1 above, it may be determined, based on the first symbol occupied by the RS, that slot 7 to slot 9 are valid uplink transmission slots. It is assumed that the first time unit is slot 0, that is, the network device transmits, in slot 0, DCI that triggers an RS. A value of the time offset indicator n is 1, and valid uplink transmission time units starting from slot 0 are slot 7, slot 8, and slot 9. In this case, the second time unit, namely, a slot in which the terminal device transmits an RS is the $2^{nd}$ time unit (that is, m is equal to 2, and the value of n is 1), namely, slot 8, in the valid uplink transmission time units (namely, slot 7, slot 8, and slot 9) starting from slot 0. Therefore, the terminal device determines to transmit the RS in slot 8 but receive SFI DCI in slot 6. The SFI DCI indicates to modify special slot 7, special slot 8, and special slot 9 to downlink transmission slots, and the terminal device transmits the RS still in special slot 8. In addition, the terminal device modifies symbol 11 to symbol 13 after the last symbol (namely, symbol 10) of the RS to downlink transmission symbols, and also modifies slot 9 to a downlink transmission slot. For another example, as shown in FIG. 23, the terminal device modifies slot 9 to a downlink transmission slot, but does not modify slot 7 and slot 8. The terminal device transmits the RS still in slot 8.

In another implementation, the time unit format becomes valid in another special time unit other than the second time unit. In other words, the another special time unit other than the second time unit is modified to a downlink transmission time unit.

For example, as shown in FIG. 23, the terminal device modifies slot 7 and slot 9 to downlink transmission slots, but does not modify slot 8. The terminal device transmits the RS still in slot 8.

It can be learned that before the RS is sent in the special time unit, when the SFI DCI that indicates to modify the special time unit to a downlink transmission time unit is received, the RS can be sent still in the special time unit. Some or all special time units or flexible time domain resources other than the special time unit may be modified to downlink transmission time units or downlink transmission time domain resources, thereby ensuring flexibility of selecting the first time unit. In addition, it helps resolve an ambiguity problem that the terminal device and the network device cannot learn whether the special time unit is used for uplink transmission or downlink transmission.

Optionally, in this embodiment of this application, after the terminal device determines the valid uplink transmission time units of the RS based on the foregoing features that the valid uplink transmission time units need to satisfy, if time domain resources occupied by the RS overlap time domain resources occupied by another RS and a priority of the RS is higher than a priority of the another RS, a time unit in which an overlapping time domain resource is located is a valid uplink transmission time unit of the RS.

In addition, if time domain resources occupied by the RS overlap time domain resources occupied by another RS and a priority of the RS is lower than a priority of the another RS, a time unit in which an overlapping time domain resource is located is an invalid uplink transmission time unit of the RS, and transmitting of the RS may be abandoned, or the second time unit for transmitting the RS may be re-determined (for example, a valid uplink transmission time unit is determined after the time unit in which the overlapping time domain resource is located).

In other words, if time domain resources occupied by a plurality of RSs overlap (that is, at least one symbol overlaps), corresponding RSs are discarded in a priority order, and an RS with a highest priority is sent. The plurality of RSs are RSs used for different functions. In a possible implementation, the priority order is: a priority of an RS used for antenna switching is higher than an RS used for codebook transmission/non-codebook transmission, and the priority of the RS used for codebook transmission/non-codebook transmission is higher than an RS used for beam management. It can be learned that, in this implementation, for an RS, if time domain resources occupied by the RS overlap time domain resources occupied by an RS for another function, and a priority of the RS is higher than a priority of the RS for the another function, the second time unit is a valid uplink transmission time unit for the RS. If the time domain resources occupied by the RS overlap the time domain resources occupied by the RS for the another function, but the priority of the RS is lower than the priority of the RS for the another function, the second time unit is an invalid (or unavailable) uplink transmission time unit for the RS.

For example, in FIG. 23, according to the reference signal transmission method in embodiments of this application, the terminal device determines to transmit, in slot 8, the RS used for antenna switching. However, when time domain resources occupied by an RS used for antenna switching overlap time domain resources occupied by an RS used for codebook transmission/non-codebook transmission in symbol 9 in slot 8, because a priority of the RS used for antenna switching is higher than a priority of the RS used for codebook transmission/non-codebook transmission, slot 8 is still a valid uplink transmission time unit for the RS used for antenna switching. Therefore, the terminal device can transmit the RS still in slot 8.

For another example, in FIG. 23, according to the reference signal transmission method in embodiments of this application, the terminal device determines to transmit, in slot 8, the RS used for codebook transmission/non-codebook transmission. However, when time domain resources occupied by an RS used for antenna switching overlap time domain resources occupied by an RS used for codebook transmission/non-codebook transmission in symbol 9 in slot 8, because a priority of the RS used for antenna switching is higher than a priority of the RS used for codebook transmission/non-codebook transmission, slot 8 is an invalid uplink transmission time unit for the RS used for codebook transmission/non-codebook transmission. Therefore, when determining the second time unit of the RS used for codebook transmission/non-codebook transmission, the terminal device needs to exclude the invalid uplink transmission time unit, namely, slot 8. That is, the terminal device determines that the second time unit is slot 9, and transmits, in slot 9, the RS for codebook transmission/non-codebook transmission.

It can be learned that, when time domain resources occupied by RSs for different functions overlap in a time unit, whether the time unit is a valid uplink transmission time unit for an RS for one function is determined based on a priority rule.

In the embodiments provided in this application, the methods provided in embodiments of this application are described from the perspectives of the network device, the terminal, and interaction between the network device and the terminal. To implement functions in the foregoing methods provided in embodiments of this application, the network device and the terminal may include a hardware structure and a software module, and implement the foregoing functions in a form of the hardware structure, the software module, or a combination of the hardware structure and the software module. A function in the foregoing functions may be performed in a form of the hardware structure, the software module, or a combination of the hardware structure and the software module.

Figure 20:
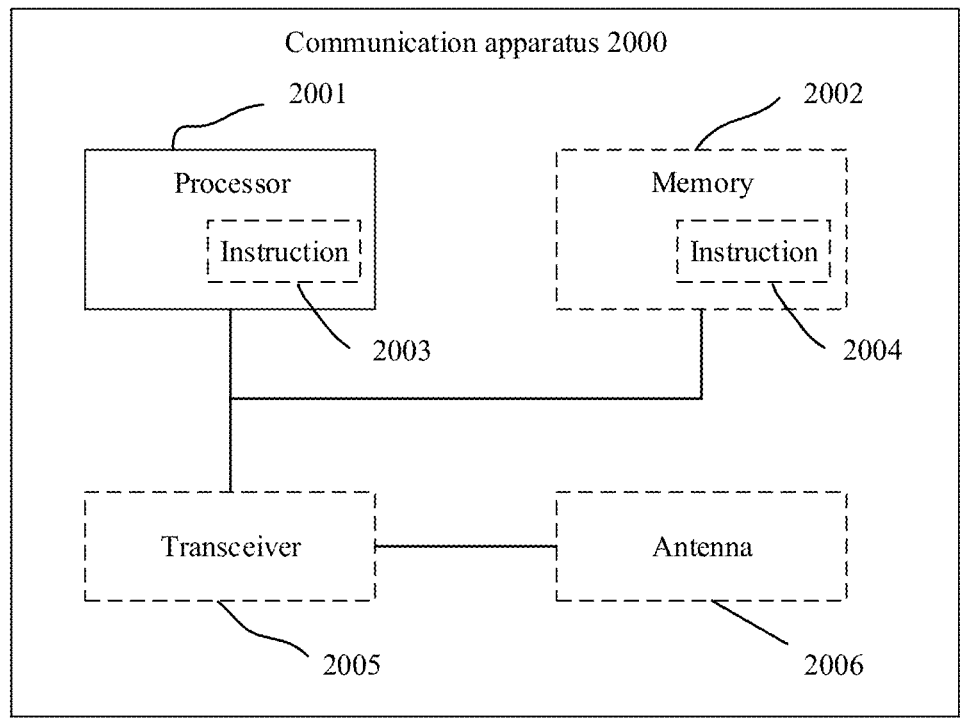
FIG. 20 is a schematic diagram of a structure of an apparatus according to an embodiment of this application.

FIG. 20 is a schematic diagram of a structure of an apparatus according to an embodiment of this application. The apparatus may be configured to implement the methods described in the foregoing method embodiments. For details, refer to the descriptions in the foregoing method embodiments.

The apparatus may include one or more processors 2001. The processor 2001 may also be referred to as a processing unit, and can implement functions of the network device or the terminal device in the methods provided in embodiments of this application. The processor 2001 may be a general-purpose processor, a special-purpose processor, or the like. The processor 2001 may be referred to as a processing unit, and control the apparatus 2000.

In an optional design, the processor 2001 may alternatively store instructions 2003, and the instructions 2003 may be run by the processor, so that the apparatus 2000 performs the methods described in the foregoing method embodiments.

In another optional design, the processor 2001 may include a communication unit configured to implement transmitting and receiving functions. For example, the communication unit may be a transceiver circuit, an interface, or an interface circuit. The processor 2001 may implement, by using the communication unit, the method performed by the network device or the method performed by the terminal device in the methods provided in embodiments of this application.

Optionally, the apparatus 2000 may include one or more memories 2002, and the memories 2002 may store instructions 2004. The instructions may be run on the processor, to enable the apparatus 2000 to perform the methods described in the foregoing method embodiments. Optionally, the memory may further store data. The processor 2001 and the memory 2002 may be separately disposed, or may be integrated together.

Optionally, the apparatus 2000 may further include a transceiver 2005 and an antenna 2006. The transceiver 2005 may be referred to as a communication unit, a transceiver, a transceiver circuit, a transceiver, or the like, and is configured to implement receiving and transmitting functions.

in an implementation, an apparatus (for example, a chip, an integrated circuit, a wireless device, or a circuit module in a terminal, or the terminal) includes:

a communication unit, configured to receive first information in a first time unit, where the first information is used to trigger the apparatus to transmit a reference signal RS.

The communication unit is configured to transmit the RS in a second time unit.

The second time unit is a time unit indicated by a time offset indicator n in valid uplink transmission time units starting from the first time unit.

Therefore, this implementation in which the time offset indicator n indicates a time unit in the valid uplink transmission time units is compared with a manner in which the time offset indicator n indicates a time offset between the first time unit and the second time unit. When a quantity of valid uplink transmission time units between the first time unit and the second time unit is less than a quantity of time units between the first time unit and the second time unit, fewer bits are required by the time offset indicator n in this implementation.

For related content of this implementation, refer to the related content about FIG. 4 to FIG. 16. Details are not described herein again. Optionally, the communication apparatus further includes a processing unit, configured to determine the second time unit based on the first time unit, where the second time unit is a time unit used by the terminal device to transmit the RS.

In another implementation, an apparatus (for example, a chip, an integrated circuit, a wireless device, or a circuit module in a terminal, or the terminal) includes:

a communication unit, configured to receive first information in a first time unit, where the first information is used to indicate the terminal device to receive a reference signal RS.

The communication unit is further configured to receive the RS in a second time unit; and The second time unit is a time unit indicated by a time offset indicator n in valid downlink transmission time units starting from the first time unit.

Therefore, this implementation is compared with a manner in which the time offset indicator n indicates a time offset between the first time unit and the second time unit. When a quantity of valid downlink transmission time units between the first time unit and the second time unit is less than a quantity of time units between the first time unit and the second time unit, fewer bits are required by the time offset indicator n in this implementation.

For related content of this implementation, refer to the related content about FIG. 17 to FIG. 19. Details are not described herein again. Optionally, the communication apparatus further includes a processing unit, configured to determine the second time unit based on the first time unit, where the second time unit is a time unit used by the terminal device to transmit the RS.

In an implementation, an apparatus 2000 (for example, a network device, a base station, a DU or a CU, a TRP, or a baseband chip) includes:

a communication unit, configured to transmit first information in a first time unit, where the first information is used to trigger a terminal device to transmit a reference signal RS.

The communication unit is further configured to receive the RS in a second time unit.

The second time unit is a time unit indicated by a time offset indicator n in valid uplink transmission time units starting from the first time unit.

For related content of this implementation, refer to the related content about FIG. 4 to FIG. 16. Details are not described herein again. Optionally, the apparatus further includes a processing unit, configured to determine the first time unit based on the second time unit.

In another implementation, an apparatus 2000 (for example, a network device, a base station, a DU or a CU, a TRP, or a baseband chip) includes:

a communication unit, configured to transmit first information in a first time unit, where the first information is used to indicate a terminal device to receive a reference signal RS.

The communication unit is further configured to transmit the RS in a second time unit.

The second time unit is a time unit indicated by a time offset indicator n in valid downlink transmission time units starting from the first time unit.

For related content of this implementation, refer to the related content about FIG. 17 to FIG. 19. Details are not described herein again. Optionally, the communication apparatus further includes a processing unit, configured to determine the first time unit based on the second time unit, where the second time unit is a time unit used by the terminal device to receive the RS.

In a possible design, an apparatus 2000 (for example, a chip, an integrated circuit, a wireless device, a circuit module in a terminal, or the terminal) may include:

a transceiver, configured to receive first information in a first time unit, where the first information is used to trigger the apparatus to transmit a reference signal RS.

The transceiver is configured to transmit the RS in a second time unit.

The second time unit is a time unit indicated by a time offset indicator n in valid uplink transmission time units starting from the first time unit.

For related content of this implementation, refer to the related content of the first aspect. Details are not described herein again. Optionally, the communication apparatus further includes a processor, configured to determine the second time unit based on the first time unit and the time offset indicator n.

Therefore, this implementation is compared with a manner in which the time offset indicator n indicates a time offset between the first time unit and the second time unit. When a quantity of valid uplink transmission time units between the first time unit and the second time unit is less than a quantity of time units between the first time unit and the second time unit, fewer bits are required by the time offset indicator n in this implementation.

For related content of this implementation, refer to the related content about FIG. 4 to FIG. 16. Details are not described herein again. Optionally, the communication apparatus further includes a processing unit, configured to determine the second time unit based on the first time unit, where the second time unit is a time unit used by the terminal device to transmit the RS.

In another possible design, an apparatus 2000 (for example, a chip, an integrated circuit, a wireless device, a circuit module in a terminal, or the terminal) may include:

a transceiver, configured to receive first information in a first time unit, where the first information is used to indicate the terminal device to receive a reference signal RS.

The transceiver is further configured to receive the RS in a second time unit.

The second time unit is a time unit indicated by a time offset indicator n in valid downlink transmission time units starting from the first time unit.

For related content of this implementation, refer to the related content about FIG. 17 to FIG. 19. Details are not described herein again. Optionally, the communication apparatus further includes a processing unit, configured to determine the second time unit based on the first time unit, where the second time unit is a time unit used by the terminal device to transmit the RS.

In a possible design, an apparatus 2000 (for example, a network device, a base station, a DU or a CU, a TRP, or a baseband chip) may include:

a transceiver, configured to transmit first information in a first time unit, where the first information is used to trigger a terminal device to transmit a reference signal RS.

The transceiver is further configured to receive the RS in a second time unit.

The second time unit is a time unit indicated by a time offset indicator n in valid uplink transmission time units starting from the first time unit.

For related content of this implementation, refer to the related content of the second aspect. Details are not described herein again. Optionally, the communication apparatus further includes a processing unit, configured to determine the first time unit based on the second time unit. The second time unit is a time unit used by the terminal device to transmit the RS.

Therefore, this implementation is compared with a manner in which the time offset indicator n indicates a time offset between the first time unit and the second time unit. When a quantity of valid uplink transmission time units between the first time unit and the second time unit is less than a quantity of time units between the first time unit and the second time unit, fewer bits are required by the time offset indicator n in this implementation.

For related content of this implementation, refer to the related content about FIG. 4 to FIG. 16. Details are not described herein again. Optionally, the communication apparatus further includes a processing unit, configured to determine the second time unit based on the first time unit, where the second time unit is a time unit used by a terminal device to transmit the RS.

In another possible design, an apparatus 2000 (for example, a network device, a base station, a DU or a CU, a TRP, or a baseband chip) may include:

a transceiver, configured to transmit first information in a first time unit, where the first information is used to indicate a terminal device to receive a reference signal RS.

The transceiver is further configured to transmit the RS in a second time unit.

The second time unit is a time unit indicated by a time offset indicator n in valid downlink transmission time units starting from the first time unit.

For related content of this implementation, refer to the related content of the fourth aspect. Details are not described herein again. Optionally, the communication apparatus further includes a processor, configured to determine the first time unit based on the second time unit, where the second time unit is a time unit used by the terminal device to receive the RS.

For related content of this implementation, refer to the related content about FIG. 17 to FIG. 19. Details are not described herein again. Optionally, the communication apparatus further includes a processing unit, configured to determine the second time unit based on the first time unit, where the second time unit is a time unit used by a terminal device to transmit the RS.

Figure 21:
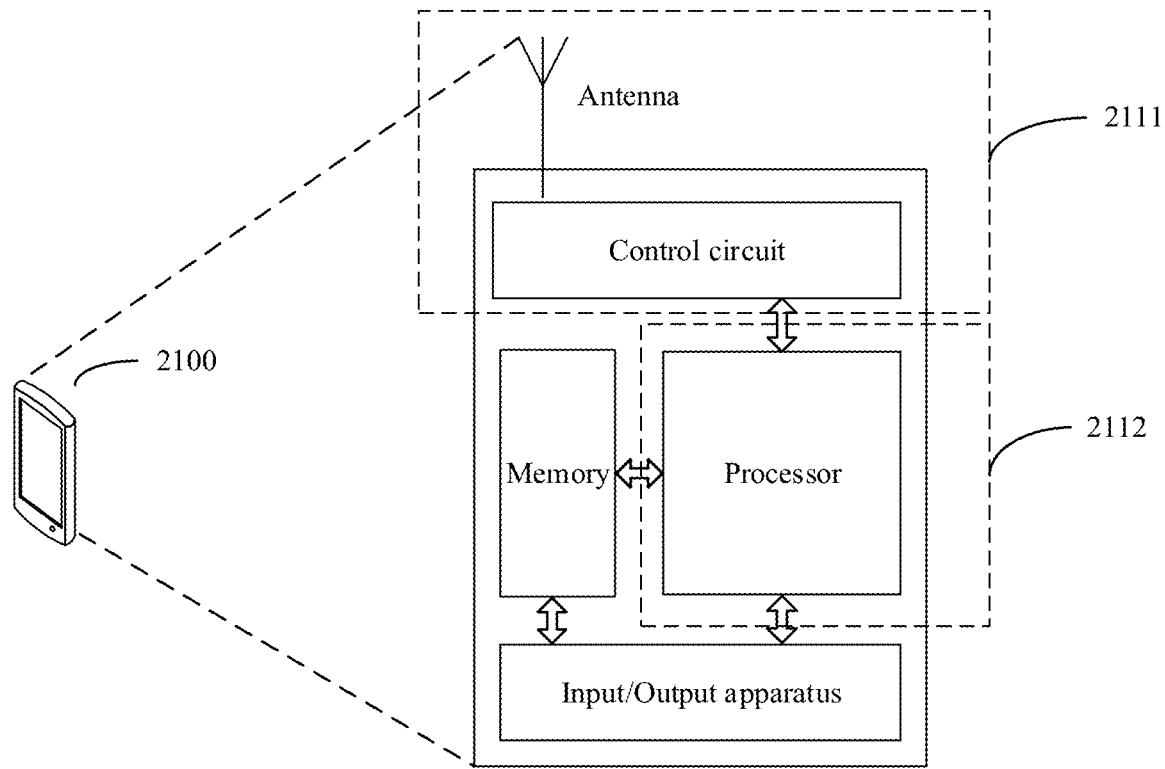
FIG. 21 is a schematic diagram of a structure of a terminal device according to an embodiment of this application.

FIG. 21 is a schematic diagram of a structure of a terminal device 2100. The terminal device is applicable to the scenario shown in FIG. 5. For ease of description, FIG. 21 shows only main components of the terminal device. As shown in FIG. 21, the terminal device includes a processor 2112, a memory, a control circuit, an antenna, and an input/output apparatus. The processor 2112 is mainly configured to: process a communication protocol and communication data, control the entire terminal, execute a software program, and process data of the software program. The memory is mainly configured to store the software program and the data. The radio frequency circuit is mainly configured to: perform conversion between a baseband signal and a radio frequency signal and process the radio frequency signal. The antenna is mainly configured to transmit and receive the radio frequency signal in a form of an electromagnetic wave. The input/output apparatus, for example, a touchscreen, a display, or a keyboard, is mainly configured to: receive data input by a user and output data to the user.

After the terminal device is powered on, the processor 2112 may read the software program in a storage unit, parse and execute instructions of the software program, and process the data of the software program. When data needs to be sent in a wireless manner, the processor performs baseband processing on the to-be-sent data, and outputs a baseband signal to the radio frequency circuit. The radio frequency circuit processes the baseband signal to obtain a radio frequency signal, and transmits the radio frequency signal to the outside in an electromagnetic wave form by using the antenna. When data is sent to the terminal device, the radio frequency circuit receives the radio frequency signal by using the antenna, further converts the radio frequency signal into a baseband signal, and outputs the baseband signal to the processor. The processor converts the baseband signal into data, and processes the data.

For ease of description, FIG. 21 shows only one memory and one processor 2112. In an actual terminal device, there may be a plurality of processors and a plurality of memories. The memory may also be referred to as a storage medium, a storage device, or the like. This is not limited in this embodiment of the present application.

In an optional implementation, the processor 2112 may include a baseband processor and a central processing unit. The baseband processor is mainly configured to process the communication protocol and the communication data. The central processing unit is mainly configured to control the entire terminal device, execute the software program, and process the data of the software program. A person skilled in the art can understand that the terminal device may include a plurality of baseband processors to adapt to different network standards, the terminal device may include a plurality of central processing units to enhance a processing capability of the terminal device, and components of the terminal device may be connected by using various buses. The baseband processor may also be described as a baseband processing circuit or a baseband processing chip. The central processing unit may also be described as a central processing circuit or a central processing chip. A function of processing the communication protocol and the communication data may be built in the processor, or may be stored in the storage unit in a form of software program. The processor executes the software program to implement a baseband processing function.

In an example, an antenna and a control circuit that have receiving and transmitting functions may be considered as a communication unit 2111 of the terminal device, and a processor that has a processing function may be considered as a processing unit 2112 of the terminal device. As shown in FIG. 21, the terminal device includes a communication unit 2111 and a processing unit 2112. The communication unit may also be referred to as a transceiver, a transceiver, a transceiver apparatus, or the like. Optionally, a component that is in the communication unit 2111 and that is configured to implement a receiving function may be considered as a receiving unit, and a component that is in the communication unit 2111 and that is configured to implement a transmitting function may be considered as a transmitting unit. That is, the communication unit 2111 includes the receiving unit and the transmitting unit. For example, the receiving unit may also be referred to as a receiver, a receiver, or a receiver circuit, and the transmitting unit may be referred to as a transmitter, a transmitter, or a transmitter circuit. Optionally, the receiving unit and the transmitting unit may be one integrated unit, or may be a plurality of independent units. The receiving unit and the transmitting unit may be in one geographical location, or may be distributed in a plurality of geographical locations.

It may be understood that, in some scenarios, some optional features in embodiments of this application may be independently implemented without depending on another feature, for example, a solution on which the optional features are currently based, to resolve a corresponding technical problem and achieve a corresponding effect. Alternatively, in some scenarios, the optional features are combined with other features based on requirements. Correspondingly, an apparatus provided in embodiments of this application may also correspondingly implement these features or functions. Details are not described herein.

In embodiments of this application, the processor may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in embodiments of this application. The general-purpose processor may be a microprocessor, any conventional processor, or the like. The steps of the methods disclosed with reference to embodiments of this application may be directly performed by a hardware processor, or may be performed by using a combination of hardware in the processor and a software module.

In this embodiment of this application, the memory may be a nonvolatile memory, such as a hard disk drive (HDD) or a solid-state drive (SSD), or may be a volatile memory, such as a random access memory (RAM). The memory is any other medium that can carry or store expected program code in a form of an instruction structure or a data structure and that can be accessed by a computer, but is not limited thereto. The memory in this embodiment of this application may alternatively be a circuit or any other apparatus that can implement a storage function, and is configured to store the program instructions and/or the data.

All or some of the foregoing embodiments may be implemented through software, hardware, firmware, or any combination thereof. When software is used for implementation, the embodiments may be implemented completely or partially in a form of a computer program product. The computer program product includes one or more computer instructions. When the computer instructions are loaded and executed on the computer, the procedure or functions according to embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

The foregoing descriptions are merely specific implementations of embodiments of the present application, but are not intended to limit the protection scope of the present application. Any variation or replacement readily figured out by a person skilled in the art within the technical scope disclosed in embodiments of the present application shall fall within the protection scope of the present application. Therefore, the protection scope of the present application shall be subject to the protection scope of the claims.

What is claimed is:

1. A A reference signal transmission method, comprising:
   receiving, by a terminal device, first information in a first time unit, wherein the first information triggers the terminal device to transmit a reference signal (RS); and
   transmitting, by the terminal device, the RS in a second time unit, wherein the second time unit is indicated by a time offset indicator in valid uplink transmission time units starting from the first time unit, wherein the second time unit is $(n+1)^{th}$ valid uplink transmission time unit among the valid uplink transmission time units, wherein n is a non-negative integer indicated by the time offset indicator, wherein the second time unit is $2^{nd}$ valid uplink transmission time unit among the valid uplink transmission time units when n is equal to 1, and wherein an overlapping uplink transmission time unit is a valid uplink transmission time unit of the RS when the valid uplink transmission time units overlap with additional uplink transmission time units occupied by an additional RS and a priority of the RS is higher than a priority of the additional RS.

2. The method according to claim 1, wherein the valid uplink transmission time units are determined based on an uplink/downlink time unit configuration.

3. The method according to claim 1, wherein the first information further indicates the time offset indicator.

4. The method according to claim 1, wherein the method further comprises:
receiving, by the terminal device, second information, wherein the second information configures the time offset indicator.

5. The method according to claim 1, wherein each of the valid uplink transmission time units is a time unit satisfying one or more of the following features:
the time unit is at least one of a special time unit or an uplink time unit;
a time domain resource offset between time domain resources occupied by the RS in the time unit and time domain resources occupied by the first information is greater than or equal to a processing delay of the RS, and the time domain resources occupied by the RS in the time unit are determined based on configuration information; or
a quantity of time domain resources in the time unit that are allowed for transmitting the RS is greater than or equal to a quantity of the time domain resources occupied by the RS, and the quantity of the time domain resources occupied by the RS is determined based on the configuration information.

6. A reference signal transmission method, comprising:
transmitting, by a network device, first information in a first time unit, wherein the first information triggers a terminal device to transmit a reference signal (RS); and
receiving, by the network device, the RS in a second time unit, wherein the second time unit is indicated by a time offset indicator in valid uplink transmission time units starting from the first time unit, wherein the second time unit is $(n+1)^{th}$ valid uplink transmission time unit among the valid uplink transmission time units, wherein n is a non-negative integer indicated by the time offset indicator, wherein the second time unit is $2^{nd}$ valid uplink transmission time unit among the valid uplink transmission time units when n is equal to 1, and wherein an overlapping uplink transmission time unit is a valid uplink transmission time unit of the RS when the valid uplink transmission time units overlap with additional uplink transmission time units occupied by an additional RS and a priority of the RS is higher than a priority of the additional RS.

7. The method according to claim 6, wherein the valid uplink transmission time units are determined based on an uplink/downlink time unit configuration.

8. The method according to claim 6, wherein the first information further indicates the time offset indicator.

9. The method according to claim 6, wherein the method further comprises:
transmitting, by the network device, second information, wherein the second information configures the time offset indicator.

10. The method according to claim 6, wherein each of the valid uplink transmission time units is a time unit satisfying one or more of the following features:
the time unit is at least one of a special time unit or an uplink time unit;
a time domain resource offset between time domain resources occupied by the RS in the time unit and time domain resources occupied by the first information is greater than or equal to a processing delay of the RS, and the time domain resources occupied by the RS in the time unit are determined based on configuration information; or
a quantity of time domain resources in the time unit that are allowed for transmitting the RS is greater than or equal to a quantity of the time domain resources occupied by the RS, and the quantity of the time domain resources occupied by the RS is determined based on the configuration information.

11. A communication apparatus, comprising:
at least one processor;
a non-transitory memory storing a computer program for execution by the at least one processor, wherein the computer program includes instructions to:
receive first information in a first time unit, wherein the first information triggers the communication apparatus to transmit a reference signal (RS);
determine a second time unit, wherein the second time unit is indicated by a time offset indicator in valid uplink transmission time units starting from the first time unit, wherein the second time unit is $(n+1)^{th}$ valid uplink transmission time unit among the valid uplink transmission time units, wherein n is a non-negative integer indicated by the time offset indicator, wherein the second time unit is $2^{nd}$ valid uplink transmission time unit among the valid uplink transmission time units when n is equal to 1, and wherein an overlapping uplink transmission time unit is a valid uplink transmission time unit of the RS when the valid uplink transmission time units overlap with additional uplink transmission time units occupied by an additional RS and a priority of the RS is higher than a priority of the additional RS; and
transmit the RS in the second time unit.

12. The communication apparatus according to claim 11, wherein the valid uplink transmission time units are determined based on an uplink/downlink time unit configuration.

13. The communication apparatus according to claim 11, wherein the first information further indicates the time offset indicator.

14. The communication apparatus according to claim 11, wherein the computer program further includes instructions to:
receive second information, wherein the second information configures the time offset indicator.

15. The communication apparatus according to claim 11, wherein each of the valid uplink transmission time units is a time unit satisfying one or more of the following features:
the time unit is at least one of a special time unit or an uplink time unit;
a time domain resource offset between time domain resources occupied by the RS in the time unit and time domain resources occupied by the first information is greater than or equal to a processing delay of the RS, and the time domain resources occupied by the RS in the time unit are determined based on configuration information; or
a quantity of time domain resources in the time unit that are allowed for transmitting the RS is greater than or equal to a quantity of the time domain resources occupied by the RS, and the quantity of the time domain resources occupied by the RS is determined based on the configuration information.

16. A second communication apparatus, comprising:
at least one processor;
a non-transitory memory storing a computer program for execution by the at least one processor, wherein the computer program includes instructions to:
  determine a first time unit and a second time unit;
  transmit first information in the first time unit, wherein the first information triggers a first communication apparatus to transmit a reference signal (RS); and
  receive the RS in the second time unit, wherein the second time unit is indicated by a time offset indicator in valid uplink transmission time units starting from the first time unit, wherein the second time unit is $(n+1)^{th}$ valid uplink transmission time unit among the valid uplink transmission time units, wherein n is a non-negative integer indicated by the time offset indicator, wherein the second time unit is $2^{nd}$ valid uplink transmission time unit among the valid uplink transmission time units when n is equal to 1, and wherein an overlapping uplink transmission time unit is a valid uplink transmission time unit of the RS when the valid uplink transmission time units overlap with additional uplink transmission time units occupied by an additional RS and a priority of the RS is higher than a priority of the additional RS.

17. The second communication apparatus according to claim 16, wherein the valid uplink transmission time units are determined based on an uplink/downlink time unit configuration.

18. The second communication apparatus according to claim 16, wherein the first information further indicates the time offset indicator.

19. The second communication apparatus according to claim 16, wherein the computer program further includes instructions to:
  transmit second information, wherein the second information configures the time offset indicator.

20. The second communication apparatus according to claim 16, wherein each of the valid uplink transmission time units is a time unit satisfying one or more of the following features:
  the time unit is at least one of a special time unit or an uplink time unit;
  a time domain resource offset between time domain resources occupied by the RS in the time unit and time domain resources occupied by the first information is greater than or equal to a processing delay of the RS, and the time domain resources occupied by the RS in the time unit are determined based on configuration information; or
  a quantity of time domain resources in the time unit that are allowed for transmitting the RS is greater than or equal to a quantity of the time domain resources occupied by the RS, and the quantity of the time domain resources occupied by the RS is determined based on the configuration information.

* * * * *

UNITED STATES PATENT AND TRADEMARK OFFICE
CERTIFICATE OF CORRECTION

PATENT NO. : 12,395,980 B2  Page 1 of 1
APPLICATION NO. : 17/690719
DATED : August 19, 2025
INVENTOR(S) : Yi Wei et al.

It is certified that error appears in the above-identified patent and that said Letters Patent is hereby corrected as shown below:

In the Claims

In Column 48, In Line 54, In Claim 1, delete "A A" and insert -- A --.

Signed and Sealed this
Twenty-third Day of December, 2025

John A. Squires
*Director of the United States Patent and Trademark Office*